(12) United States Patent
Barkan

(10) Patent No.: US 9,578,177 B2
(45) Date of Patent: Feb. 21, 2017

(54) ESTABLISHING TELEPHONE COMMUNICATIONS WITH SECONDARY DEVICES

(71) Applicant: Elad Pinhas Barkan, Kefar Sirkin (IL)

(72) Inventor: Elad Pinhas Barkan, Kefar Sirkin (IL)

(73) Assignee: iChoose Applications LTD., Nes Ziona (IL)

( * ) Notice: Subject to any disclaimer, the term of this patent is extended or adjusted under 35 U.S.C. 154(b) by 0 days.

(21) Appl. No.: 14/785,686

(22) PCT Filed: Apr. 17, 2014

(86) PCT No.: PCT/IB2014/001192
§ 371 (c)(1),
(2) Date: Oct. 20, 2015

(87) PCT Pub. No.: WO2014/170754
PCT Pub. Date: Oct. 23, 2014

(65) Prior Publication Data
US 2016/0072955 A1    Mar. 10, 2016

Related U.S. Application Data

(60) Provisional application No. 61/814,242, filed on Apr. 20, 2013, provisional application No. 61/908,117, filed on Nov. 24, 2013.

(51) Int. Cl.
H04M 3/42        (2006.01)
H04M 3/54        (2006.01)
H04M 7/00        (2006.01)

(52) U.S. Cl.
CPC ......... H04M 3/543 (2013.01); H04M 3/42153 (2013.01); H04M 3/42212 (2013.01);
(Continued)

(58) Field of Classification Search
CPC ....................................................... H04M 3/42
(Continued)

(56) References Cited

U.S. PATENT DOCUMENTS 6,498,845 B1   12/2002   Martz et al.
6,771,761 B1    8/2004   Lapierre
(Continued)

FOREIGN PATENT DOCUMENTS

EP           1319314           3/2011
EP           2247087 A1       11/2013
WO     WO 2004/049686         6/2004

OTHER PUBLICATIONS

International Search Report and Written Opinion of the International Searching Authority issued in International Application No. PCT/IB2014/01192 on Dec. 19, 2014; 16 pages.
(Continued)

Primary Examiner — Michael V Vu
(74) Attorney, Agent, or Firm — Fish & Richardson P.C.

(57) ABSTRACT

A method, system, and apparatus, including a program encoded on computer-readable medium, for providing ring notifications in parallel to a primary incoming call are disclosed. An example method can include receiving, at a server system, a notification of a primary incoming call directed to a subscriber telephone number associated with a user device, notifying, by the server system, one or more secondary destinations of the primary incoming call based on the notification, sending, from the server system, an instruction to perform one or more operations to trigger forwarding of the primary incoming call to a telephone number associated with the server system, wherein the instruction is only sent after notifying the one or more secondary destinations of the primary incoming call, receiving the forwarded incoming call at the server system, and
(Continued)

connecting, by the server system, the forwarded incoming call to a particular secondary destination.

47 Claims, 6 Drawing Sheets

(52) U.S. Cl.
CPC ... *H04M 3/42348* (2013.01); *H04M 3/42365* (2013.01); *H04M 7/0033* (2013.01); *H04M 2242/14* (2013.01)

(58) Field of Classification Search
USPC .................................................. 455/417–421
See application file for complete search history.

(56) References Cited

U.S. PATENT DOCUMENTS

| | | | |
|---|---|---|---|
| 6,823,056 B1 * | 11/2004 | Hussain .............. | H04M 3/4217 379/201.01 |
| 2008/0002820 A1 * | 1/2008 | Shtiegman ........ | H04L 29/06027 379/211.02 |
| 2010/0119049 A1 * | 5/2010 | Clark ................ | H04M 3/42153 379/201.01 |
| 2011/0294482 A1 | 12/2011 | Dennert et al. | |

OTHER PUBLICATIONS

International Preliminary Report on Patentability issued in International Application No. PCT/IB2014/01192 on May 22, 2015; 37 pages.
Supplemental European Search Report issued in European Application No. 14785517.5 dated Nov. 30, 2016, 4 pages.

* cited by examiner

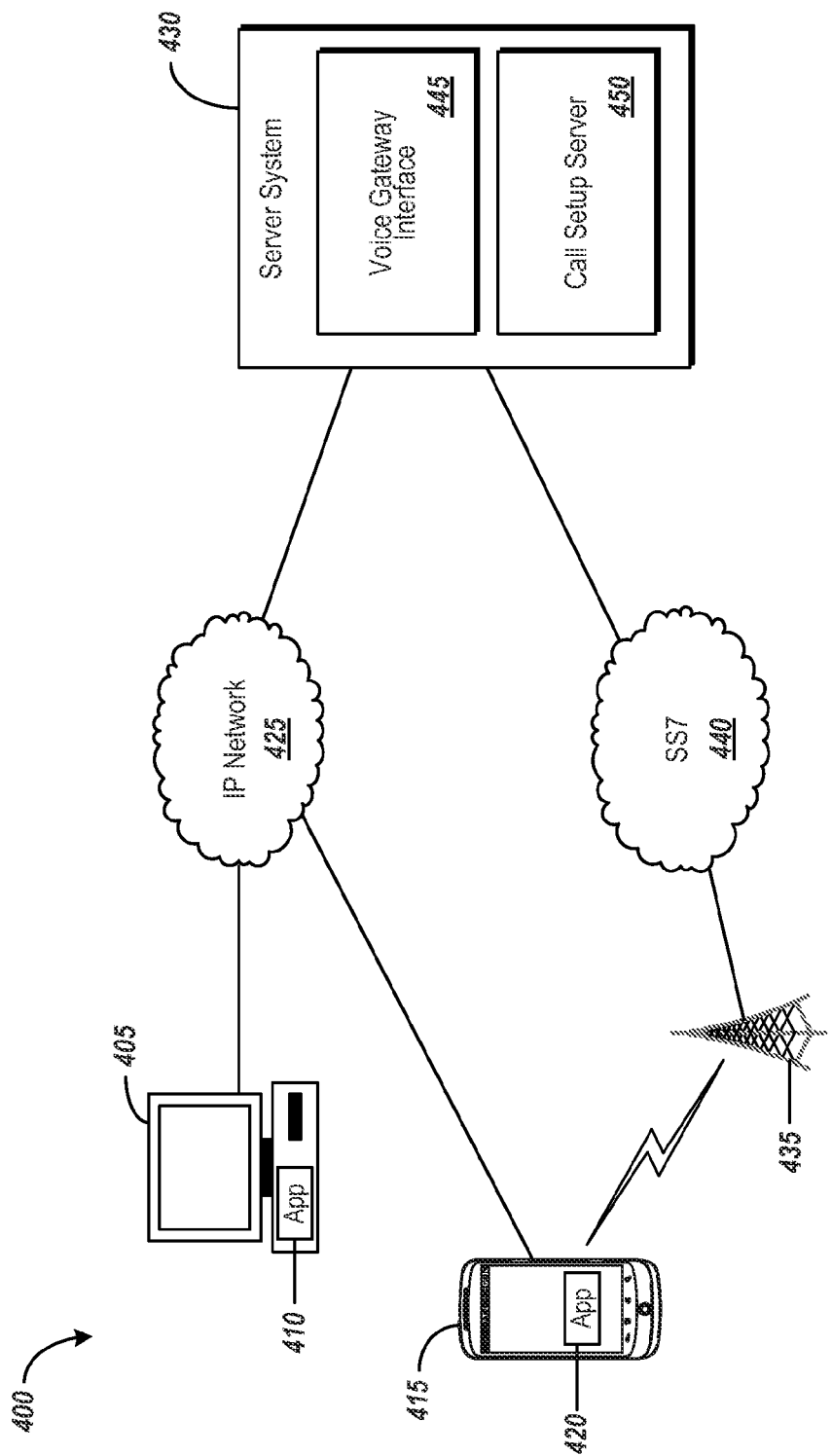

ESTABLISHING TELEPHONE COMMUNICATIONS WITH SECONDARY DEVICES

CROSS-REFERENCE TO RELATED APPLICATIONS

This application is a U.S. National Stage of PCT/IB2014/001192 filed on Apr. 17, 2014, which is related to and claims the benefit of U.S. Provisional Application No. 61/814,242, titled "A System and Method for Mobile Communication Utilizing a Plurality of Devices", filed on Apr. 20, 2013, U.S. Provisional Application No. 61/908,117, titled "A System and Method for Mobile Communication Utilizing a Plurality of Devices", filed on Nov. 24, 2013, all of which are incorporated herein by reference. International Application No. PCT/IB2013/002338, filed on Aug. 26, 2013, entitled "Redirecting Cellular Telephone Communications Through a Data Network," U.S. Provisional Application No. 61/693,316, titled "Apparatus, System and Method for Forwarding Communication in Network and its Prevention," filed on Aug. 26, 2012, and U.S. Provisional Application No. 61/727,744, titled "Forwarding System and Method and Discovery and Verification of MSISDN by a Mobile App System and Method," filed on Nov. 18, 2012, are also hereby incorporated by reference.

BACKGROUND

This description relates to telephone communications, and more particularly to establishing telephone communications with secondary devices.

Systems for mobile telecommunications emerged in recent decades and are extending on the more traditional landline system. Systems for mobile communications are typically deployed in a certain geographic area. Service is typically provided using cellular communication towers with antennas communicatively connected to a central office. In the central office there are core components that enable the different features of the network. For example, in GSM (Global System for Mobile Communications), one of these components is a Home Location Register (HLR). The HLR stores for each user a directory number also commonly known as Mobile Subscriber Integrated Services Digital Network-Number (MSISDN), or commonly referred to as a phone number. The MSISDN serves as an identifier for the user in the global telephony network, and in this application we refer to MSISDN and phone number interchangeably. People call each other by dialing the MSISDN for the destination. During an incoming call or message there is a component in the mobile network that translates the dialed MSISDN to an International Mobile Subscriber Identity (IMSI) which is the identity that is used within the mobile network to reach the subscriber.

Each subscriber is identified in and authenticated to the network using a Subscriber Identity Module (SIM) card. This SIM card holds a secret number Ki (typically 128-bit), which is stored securely on the SIM card and cannot be read from the card. The same Ki is stored for the user in the network Authentication Center (AuC), which is usually deployed together with the HLR. The SIM card also stores the IMSI, though the IMSI is read from the card by the mobile phone. A mobile network can authenticate a mobile phone asking for services from the network by verifying that the mobile phone has a SIM card that contains the secret Ki for that user. The authentication protocol between the mobile phone and the network typically involves sending a message in which the phone identifies itself, initially with its IMSI that the mobile phone reads from the SIM card. In response, the network challenges the mobile phone with a challenge C. The mobile phone transfers this challenge C to the SIM card, which uses its secret Ki to compute a response F(C,Ki). F is a cryptographically designed function such that from knowing (or even choosing C), and obtaining F(C,Ki) it is practically impossible to find the secret Ki, hence for a given IMSI, only the authentic SIM card can compute F(C,Ki) as only the authentic SIM has Ki. The Authentication Center also stores the secret Ki for that IMSI and can thus compute F(C,Ki) and verify the response by the mobile phone, thereby verifying that the authentic SIM card is in the phone. Some variations of this general protocol can also be implemented. For example, the mobile phone can authenticate the network to verify that the mobile phone is not being connected to a fake network.

The network can initiate authentication for every service it provides to the mobile phone including for incoming services such as receiving a call or a Short Message Service (SMS). The network can also ask the phone to encrypt the conversation between the network and the phone, where the encryption keys are derived from C and Ki in a similar way to the authentication and typically as part of the authentication process. For example, some of the bits of F(C,Ki) can be returned to the network as a proof of holding Ki, and some of the bits can be kept by the phone as encryption and/or integrity keys. The HLR also stores the last known location for each user. Each cell tower is typically associated with a Mobile Switching Center (MSC) that routes calls and handles needed mobility management to keep calls, data, SMS, and other mobile services working even when users are moving between cell towers and even if the cell towers belong to different MSCs.

Each MSC has an associated Visitor Location Register (VLR). A VLR is a network component that keeps track of the cell location of each user in the coverage area of the MSC and associated VLR. The VLR reports the location of the mobile phone to the HLR associated with the mobile phone. Depending on the network configuration, a VLR can update the HLR when a user first enters the coverage of that specific VLR, but not update for every cell change in that VLR. In other cases, more detailed reporting is carried between the VLR to the HLR. For instance, the VLR can notify the HLR once a certain time-period has passed since receiving the current location of a mobile device. Alternatively, the VLR can update the HLR of every instance when the user changes cell towers, or with every location area change (e.g., where a location area is defined as one or more cells indicated as belonging to a location area. Each cell can belong to one location area, and each location area can belong to one VLR).

In addition to voice services, cellular service providers have deployed other services such as the ability to send and receive text messages to and from other users, a service commonly referred to as SMS (short message service).

A need often arises for users to travel with their mobile phone outside the coverage area of their home network, i.e., out of the coverage area of their mobile service provider that provides the user with a mobile subscription. To address such situations, mobile operators are typically connected in a series of roaming agreements with other operators or roaming brokers to provide roaming services to their subscribers. Such agreements allow users to obtain mobile service even when they are outside of their home network, although such roaming services are typically expensive relative to service within the user's home network.

Most signaling communication, as well as some of the data communication (such as SMS) is carried over a signaling network called Signaling System No. 7 (SS#7 or SS7). This network is used for communication inside a provider's network, and operators that have roaming agreements are typically also connected over SS7 networks. As networks are transitioning to an all-IP network, the SS7 is being complemented and replaced with other standards such as the Diameter protocol.

As telecommunication systems have evolved, new types of communications also emerged, such as Voice over IP (VoIP), where users can receive and make phone calls over the Internet. Mobile applications running on smart phones and smart devices have emerged, mostly due to the appearance of the iPhone® by Apple Inc., followed by smart devices and phones by other manufacturers. Some of the emerged mobile applications allow receiving and sending short messages as well as running VoIP application on the smart devices. Some manufacturers have included their own applications that allow these capabilities within the basic distribution that arrives with purchased phones. These services sometimes communicate over a data network, typically carrying voice, messages, and video data over IP (Internet Protocol). Users consume these services on various devices such as personal computers, laptop devices, tablet devices, handheld phones, PDAs and the like, although such services generally are distinct from conventional cellular communications and require use of an application on the device or accessed through a web page. However, with the advance of new telecommunications, the borders between computing devices and different communication devices blur and the experience is becoming a mobile device experience. Still, many of the communication services depend on an MSISDN as identifier for destination and calls are typically terminated at the user's device which is associated with the MSISDN.

SUMMARY

In accordance with aspects described in this specification, users can answer calls directed to their telephone number (e.g., MSISDN or other directory number or identifier) using an application on another device ("secondary device") or on the device associated with their telephone number ("primary device"). For example, it may be desired for users to selectively answer calls through an application or software on one of their secondary devices rather than on the user's primary device. In other cases, users may prefer to answer the calls using an application on their primary device where the call is routed over VoIP. For example, a primary device can be a mobile phone or another cellular-connectivity enabled device. Additionally, answering calls on a secondary device may be more convenient than answering on the user's primary device and can potentially reduce the amount of electro-magnetic radiation that a user is exposed to while communicating (e.g., answering a call on a landline rather than on a mobile phone). Similarly, a user may wish to place outgoing calls through an application on any one of multiple secondary devices rather than using a conventional outgoing telephone call, or may wish to initiate the call on one device, but participate on the call on another device.

In one general aspect, a method includes, at a server system, receiving a notification of a primary incoming call directed to a subscriber telephone number associated with a user device, notifying one or more secondary destinations of the primary incoming call based on the notification, sending an instruction to perform one or more operations to trigger forwarding of the primary incoming call to a telephone number associated with the server system, wherein the instruction is only sent after notifying the one or more secondary destinations of the primary incoming call, receiving the forwarded incoming call at the server system, and connecting, by the server system, the forwarded incoming call to a particular secondary destination, Other aspects include corresponding apparatus, systems, and computer software, stored on a computer storage medium and executable on one or more computers.

Implementations can include one or more of the following features. The method may further comprise requesting the registration of conditional call forwarding on busy on the subscription associated with the subscriber telephone number with the destination of the forwarding being set to the telephone number associated with the server system, wherein the one or more operations include rejecting the primary incoming call at the user device, and wherein the registration of the conditional call forwarding is performed prior to the rejection of the primary incoming call. The instruction to perform one or more operations is sent to an application on the user device, and wherein the instruction to perform one or more operations instructs the application to reject the primary incoming call in response to receiving the instruction to perform one or more operations, wherein rejecting the primary incoming call triggers the conditional call forwarding on busy. The registration of conditional call forwarding on busy can be requested by the server system to a server managing the subscription associated with the subscriber telephone number. The request to register the conditional call forwarding on busy can be requested from the application on the user device. In some instances, an instruction is sent from the server system to the application on the user device requesting the application to trigger conditional call forwarding.

In some implementations, the one or more secondary destinations include a VoIP application on the user device. In some implementations, a calling party identifier is associated with the primary incoming call and the notification of the primary incoming call includes the calling party identifier, wherein the server system associates the forwarded incoming call with the particular secondary destination based on a match between the calling party identifier included in the notification of the primary incoming call and a calling party identifier associated with the received forwarded incoming call. In some implementations, a calling party identifier is associated with the primary incoming call, wherein the server system generates a voice message associated with the calling party identifier, and wherein the server system plays the generated voice message at the particular secondary location in response to a request to answer the forwarded incoming call. In some implementations, the server system associates the forwarded incoming call with the particular secondary destination based on an identifier corresponding to the subscriber telephone number associated with the received forwarded incoming call. The server system can associate the forwarded incoming call with the particular secondary destination based on the telephone number associated with the server system at which the forwarded incoming call is received. In some instances, a calling party identifier is associated with the primary incoming call and the notification of the primary incoming call includes the calling party identifier, and wherein notifying one or more secondary destinations of the primary incoming call includes providing the one or more secondary destinations with a calling party identifier consistent with the calling party identifier associated with the primary incoming call.

In some implementations, the method further comprises receiving, at the server system, a request to forward the forwarded incoming call to an alternative destination after connecting the forwarded incoming call to the particular secondary destination, the alternative destination different than the particular secondary destination and connecting the forwarded incoming call to the alternative destination in response to the request to forward the forwarded incoming call. The request to forward the forwarded incoming call to the alternative destination can be received from an application on the user device. The request to forward the forwarded incoming call to the alternative destination can be received from an application on a device associated with one of the one or more secondary destinations.

In some implementations, the method further comprises registering conditional call forwarding for the subscriber telephone number to the telephone number associated with the server system based on one or more parameters for the user device or the one or more destinations, with the parameters selected from the group consisting of location of the user device or other device, time of day, date, proximity of the user device to another device, relative proximity of devices associated with the one or more secondary destinations to the user device, availability of a wired or wireless data connection for the user device, availability of a wired or wireless data connection for the devices associated with the one or more secondary destinations, data communication speed, data communication latency, cellular connection status, recentness of activity on device, rate of movement, a ringing state of the user device, a cellular ID to which the user device is connected, and a list of Wi-Fi networks in proximity of the user device.

In some implementations, the method further comprises notifying the one or more secondary destinations based on one or more parameters, wherein the one or more parameters include determining a physical location of the user device and a physical location of the one or more secondary destinations and notifying the one or more secondary destinations within a pre-determined distance from the user device. In some implementations, determining the physical location of the user device and the one or more secondary destinations is based on sampled location information associated with the user device and the one or more secondary destinations.

In some implementations, the method further comprises notifying the one or more secondary destinations is based on one or more parameters, wherein the one or more parameters include a parameter based on whether the user device is in close proximity to the one or more secondary destinations, wherein close proximity is determined by identifying a set of wireless networks available to the user device, identifying a set of wireless networks associated with one or more secondary destinations, and notifying the one or more secondary destinations associated with at least one wireless network available to the user device. In some instances, the set of wireless networks associated with at least one of the one or more secondary destinations is determined based on location of the user device at a time when the at least one secondary location is added as a potential secondary destination.

In some implementations, the method further comprises notifying the one or more secondary destinations based on one or more parameters, wherein the one or more parameters include a determination of a whether the user device is one of a silent, vibrate, or ringing ringer state. In some implementations, the method further comprises notifying the one or more secondary destinations based on one or more parameters for the user device or the one or more secondary destinations, with the parameters selected from the group consisting of location of the user device or other m device, time of day, date, availability of a wired or wireless data connection for the user device, availability of a wired or wireless data connection for the devices associated with the one or more secondary destinations, data communication speed, data communication latency, cellular connection status, recentness of activity on device, rate of movement, a ringing state of the user device, and a cellular ID to which the user device is connected.

In some implementations, the user device is a mobile device and an application on the mobile device communicates with the server system to update a list of devices to be notified of incoming calls. In some implementations, the primary incoming call comprises a first incoming call, and the method further comprises receiving a second incoming call directed to the subscriber telephone number while the first incoming call is ongoing and allowing a user to answer the second incoming call at one of the other secondary destinations while the first incoming call is ongoing. The method may further comprise connecting, at the server system and in response to a user request, the first incoming call and the second incoming call in a conference. In some implementations, the method further comprises receiving a request at the server system to initiate an outgoing call using the subscriber telephone number as a calling party number while the first incoming call is ongoing and initiating, by instructions from the server system, the outgoing call from one of the other secondary destinations while the incoming call is ongoing. The method may further comprise connecting, at the server system and in response to a user request, the incoming call and the outgoing call in a conference.

In some implementations, the method may further comprise providing an indication of the called party on at least one of the other secondary destinations. In some implementations, the method may further comprise using the server system to handover the incoming call from a device associated with the particular secondary destination used to answer the incoming call to another device associated with one of the secondary destinations.

In some implementations, the server system is associated with a mobile service provider. The one or more secondary destinations can be determined based on a location of the user device. The one or more notified secondary destinations are a subset of a plurality of potential secondary destinations. In some implementations, the user device is a mobile device.

In one general aspect, a method includes receiving, at a server system, a notification of a primary incoming call directed to a subscriber telephone number associated with a user device, notifying, by the server system, one or more secondary destinations of the primary incoming call based on the notification, wherein the notification includes initiating calls to the one or more secondary destinations to ring in parallel to the user device, receiving, by the server system, a notification that the user device has answered the primary incoming call, and cancelling, from the server system, the initiated calls to the one or more secondary destinations in response to receiving the notification that the user device has answered the primary call. Other aspects include corresponding apparatus, systems, and computer software, stored on a computer storage medium and executable on one or more computers.

In another general aspect, a computer storage medium is encoded with a computer program, and the program includes instructions that when executed by data processing apparatus cause the data processing apparatus to perform operations including sending, to a server system, a notification of an incoming call directed to a subscriber number, wherein the server system is adapted to notify one or more secondary destinations of the incoming call based on the notification and to receive a request to answer the incoming call at one of the destinations, and receiving an instruction to perform one or more operations to cause forwarding of the incoming call to a telephone number associated with the server system, wherein forwarding the incoming call enables the server system to connect the incoming call to the requested secondary destination. Other aspects include corresponding apparatus, systems, and methods.

Implementations can include one or more of the following features. In one implementation, the instruction is received from the server system in response to the server system receiving a request to answer the incoming call at one of the secondary destinations. In one implementation, the operations further comprise receiving an instruction to register conditional call forwarding for the subscriber telephone number to the telephone number associated with the server system, and wherein the conditional call forwarding is registered before receiving the instruction to perform one or more operations to cause forwarding of the incoming call. The operations may further include rejecting the incoming call to cause forwarding of the incoming call. In one implementation, the one or more operations indicated by the received instruction include registering call forwarding to the telephone number associated with the server system.

In another general aspect, a system includes a user device associated with a subscriber telephone number, the user device having an application adapted to send a notification of an incoming call directed to the subscriber telephone number; and one or more servers, wherein the one or more servers are adapted to receive the notification of the incoming call from the user device, notify one or more secondary destinations of the incoming call based on the received notification, identify a request to answer the incoming call at one of the secondary destinations, send an instruction to the application on the user device to perform one or more operations to cause forwarding of the incoming call to a telephone number associated with the one or more servers, receive the forwarded incoming call, and connect the forwarded incoming call to the secondary destination identified in the request. Other aspects include corresponding apparatus, methods, and computer software, stored on a computer storage medium and executable on one or more computers.

Implementations can include one or more of the following features. In one implementation, the one or more servers are further adapted to request registration of conditional call forwarding for the subscriber telephone number to the telephone number associated with the one or more servers. In one implementation, the one or more operations include triggering conditional call forwarding for the subscriber telephone number to the telephone number associated with the one or more servers and the application is further adapted to register conditional call forwarding for the subscriber telephone number. In one implementation, the instruction is sent in response to the receiving the request to answer the incoming call at one of the secondary destinations. The one or more operations can include rejecting the incoming call and wherein the application is further adapted to reject the incoming call at the user device in response to the instruction. In one implementation, the one or more servers are further adapted to identify the one or more secondary destinations to notify of the incoming call. In some instances, identifying the one or more secondary destinations to notify of the incoming call includes identifying at least one parameter associated with at least one of the incoming call and at least one of the secondary destinations and generating a ring list of the one or more secondary destinations based at least in part on the at least one identified parameters, wherein the generated ring list includes the one or more secondary destinations to notify of the incoming call.

In one general aspect, a method includes receiving, via a data communication network, a call setup request initiated from an application on a first user device for a call connection between the first user device and a second user device, receiving, via a telephone network, a telephone call from the second user device to a telephone number associated with a server system, where the call is initiated using an application on the second user device, and establishing, at the server system, a call connection between the first user device and the second user device using the telephone call between the second user device and the server system and using a communication path between the server system and the first user device. Other aspects include corresponding apparatus, systems, and computer software, stored on a computer storage medium and executable on one or more computers.

Implementations can include one or more of the following features. In one implementation, the telephone call is initiated in response to a user interaction with the second user device indicating a request to answer the call. In one implementation, the communication path between the server system and the first user device comprises a packet-switched communication path. In one implementation, the communication path between the server system and the first user device comprises a telephone call from the first user device to a telephone number associated with the server system. The telephone call from the first user device to a telephone number associated with the server system is initiated by the application on the first user device. In one implementation, the call setup request is received by the server system, wherein the server system sends a message to the application on the second user device in response to receiving the call setup request. In one implementation, the call setup request is received by the application on the second user device.

In another general aspect, a computer storage medium is encoded with a computer program, and the program includes instructions that when executed by data processing apparatus cause the data processing apparatus to perform operations including receiving, via a data communication network, a call setup request initiated from an application on a remote user device for a call connection, and initiating, via a telephone network, a telephone call to a telephone number associated with a server system in response to receiving the call setup request, wherein the server system is adapted to establish a call connection with the first user device using the telephone call and a communication path between the server and the first user device. Other aspects include corresponding apparatus, systems, and methods.

Implementations can include one or more of the following features. In one implementation, the operations further include providing a notification of an incoming call corresponding to the call setup request using a user interface and receiving a user input indicating a request to answer the incoming call.

In another general aspect, a system includes a first user device having an application adapted to send, via a data communication network, a call setup request for a call connection with a second user device, and one or more servers. The one or more servers are adapted to receive the call setup request, send a notification of the call setup request to an application on the second user device via a data communication network in response to the received call setup request, receive a telephone call from the second user device at a telephone number associated with the one or more servers, wherein the telephone call is initiated by the application on the second user device in response to the notification, and establish a call connection between the first user device and the second user device using the telephone call from the second user device and a communication path between the one or more servers and the first user device. Other aspects include corresponding apparatus, methods, and computer software, stored on a computer storage medium and executable on one or more computers.

Implementations can include one or more of the following features. In one implementation the communication path comprises a telephone call between the first user device and a telephone number associated with the one or more servers. In one implementation, the communication path comprises a packet-switched communication path between the first user device and a telephone number associated with the one or more servers. In one implementation, the system further comprises a second user device, wherein the application on the second user device is adapted to provide a user notification of an incoming call corresponding to the call setup request and to initiate the telephone call in response to a user request to answer the incoming call.

The details of one or more implementations are set forth in the accompanying drawings and the description below. Other features will be apparent to from the description and drawings, and from the claims.

DESCRIPTION OF DRAWINGS

FIG. 4 illustrates a communication system that facilitates establishing calls using applications on calling party and called party devices.

Like reference symbols in the various drawings indicate like elements.

DETAILED DESCRIPTION

Figure 1:
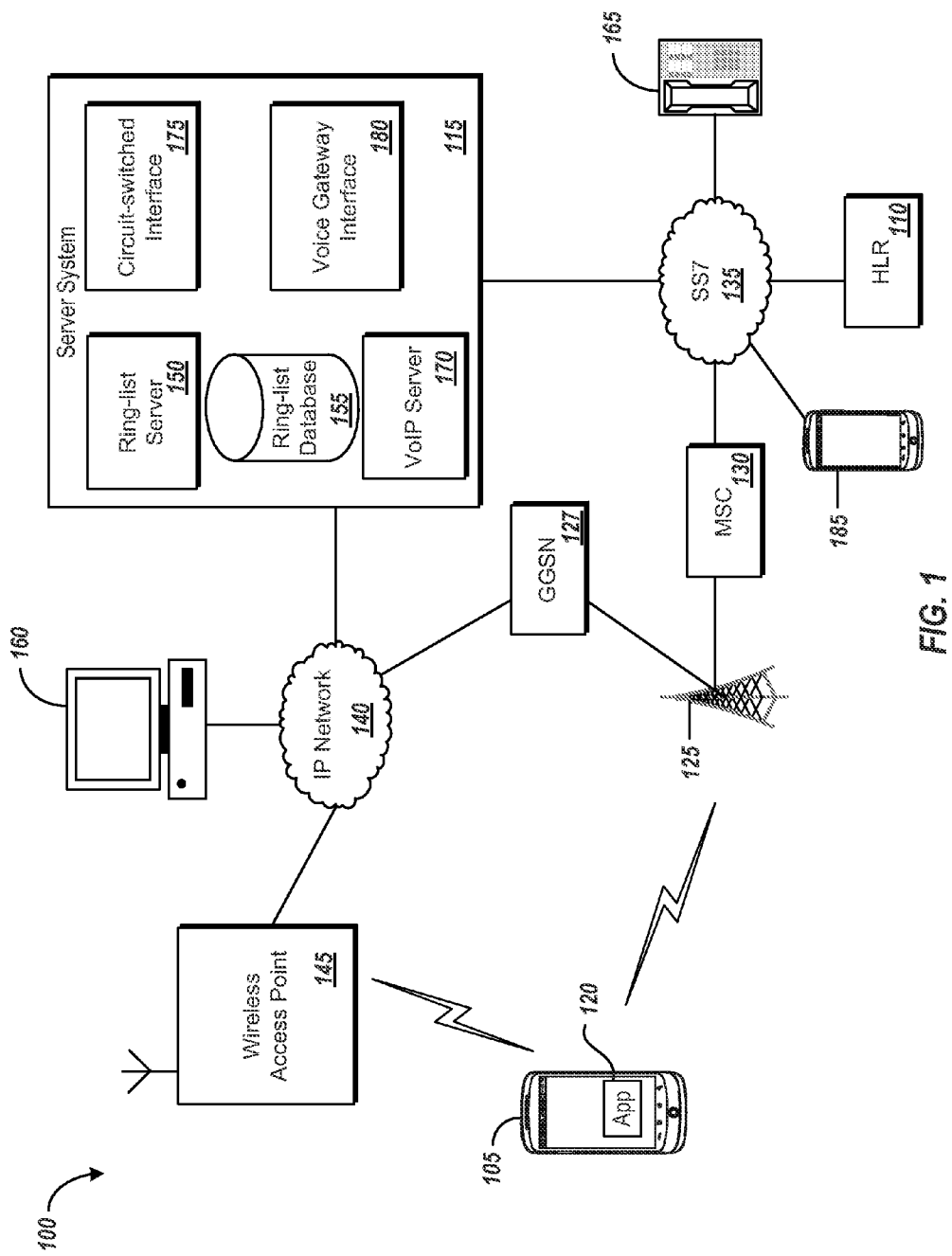
FIG. 1 illustrates a communication system that allows incoming calls to a mobile device to be answered at one or more secondary destinations.

In accordance with aspects described in this specification, communications associated with a single user telephone number or telephone identifier can be conducted on any one of a plurality of devices selected by the user. A server system is capable of forwarding voice calls, text messages and the like to a device in parallel or instead of the voice calls, text messages and the like reaching a primary device, such as mobile phone or other suitable telephone or telephone-like device, or another device with telephone abilities such as a personal computer (PC), tablet device, smart watch, or non-phone mobile device with a voice application which can receive voice calls. Associated with a telephone subscriber is an identifier such as a Mobile Subscriber Integrated Services Digital Network Number (MSISDN) or other telephone identifier which the subscriber can provide to anyone that wishes to call the subscriber or send a text message to the subscriber. The server system may redirect voice calls, text messages, or other services in accordance with user preference. For example, a user may receive calls directed to the user's MSISDN on an application running on his mobile phone. A user may alternatively elect to direct calls or messages to any device or destination on a list of devices the user provides to the server system, such as a landline or a voice application on the user's tablet computer.

Typically, a user receives an incoming call on a mobile phone or other telephone having an associated telephone number registered with a service provider. Herein, the phrases "registered phone" or "primary device" or "primary destination" are used interchangeably). In accordance with aspects of this specification, however, incoming calls can be selectively redirected or ring in parallel using a ring-list includes a list of all the phones, devices, and/or destinations that should ring on an incoming call in addition to the registered phone. The ring-list forms the list of secondary destinations that should ring on an incoming call to the primary device. At least some of the phones, devices, and/or destinations included in the ring-list may be included based on parameters such as time of day, location of the mobile phone, location of the mobile phone in relation to the location of the one or more secondary devices, a caller's identity, mobile reception on primary devices and network quality on the secondary devices, whether the primary device is on vibrate or on a silent state (and not ringing), as well as other suitable parameters, including those set up manually by the user. For example, if the primary device is on vibrate or silent, the ring-list can be set to not ring on certain devices, such as those located physically close to the primary device. The conditions and list of secondary destinations that may be included in a ring-list for a primary device or user are stored in a ring-list database for that primary device or user. Furthermore, the ring-list may include a secondary destination corresponding to a VoIP application on the registered phone—i.e., so the application on the registered phone can ring on an incoming call. When an incoming call is received by the mobile network, the result is that all the communication endpoints on the ring-list ring and the user can choose which one to answer by simply answering the call on that ringing endpoint. The user can also indicate—through a suitable man-machine interface—a request for one or more of the secondary destinations to stop ringing, or a request for a secondary destination to ring in parallel if that destination is currently not ringing, or a request to divert the call to a particular secondary destination and stop ringing on the primary destination, among other options.

In some implementations, a mobile application is installed on the registered phone. A preliminary action for the service is to register a conditional "call forwarding on busy" on the subscription of the registered phone, where the destination of the call forwarding on busy is a voice gateway interface of a server system (this process is referred to as "call forwarding on busy registration"). Taking GSM (Global System for Mobile Communications) as an example, the call forwarding on busy can be registered by the mobile application on the primary device, or by the server system communicating through the SS#7 network with the HLR associated with the subscription of the registered phone or with the VLR who is serving the mobile phone. The mobile application can communicate with the server system over a data network (e.g., the Internet). The voice gateway interface of the server system can have one or more associated phone numbers for receiving forwarded calls. The call forwarding on busy is registered with the forwarding destination set to one of the phone numbers associated with the voice gateway interface, where the phone number is preferably chosen such that a call from the registered phone to this phone number is a local call in accordance with the subscription of the registered phone. One implementation for having a phone number associated with the voice gateway interface is known in the industry as DID—Direct Inward Dial When the primary device rings on an incoming call, we refer to this call as a "primary call." The mobile application running on the primary device sends a message notification to the server system notifying of the incoming primary call ("incoming-call report"). The server system receives the incoming-call report from the mobile application on the registered phone while the phone is ringing. The incoming-call report can be sent over the Internet, for example. The Internet connection can be, for example, a mobile data-based Internet connection, or a Wi-Fi-based Internet connection, or another type of packet-switched connection. The report can include identification of the calling party such as the telephone number of the calling party (i.e., caller ID). The server system initiates voice call setup messages to the secondary devices and destinations present on the ring-list associated with the user, where the ring-list can identify one or more secondary devices or destinations. If the call is answered on one of the secondary devices on the ring-list, the server system can, in response to determining that a secondary device has answered the call, instruct the mobile application to reject the call on the registered phone, which triggers the conditional call forwarding on busy feature to forward the call to the telephone number associated with the voice gateway interface of the server system. The server system can then connect the incoming call received on the voice gateway interface to the already established outgoing call to the secondary destination that answered the call. As the outgoing call is already established, the server system needs to answer the incoming call and bridge it to the already established outgoing call.

FIG. 1 illustrates a communication system (e.g., a GSM-based system) 100 that allows incoming calls to a mobile device to be answered at one or more secondary destinations. The system 100 includes a mobile phone 105 that is registered for cellular communications with an HLR 110 and a server system 115 that provides multi-device calling services to the user of the mobile phone 105. In some instances, the server system 115 may provide at least some of the multi-device calling services separate from the cellular services provided by the user's cellular service provider. The mobile phone 105 includes an installed application 120 that is registered with the server system 115 for the multi-device calling services. In some instances, the application 120 may be included in or a part of the underlying mobile operating system, while in other instances, the application 120 may be a separate app or application from the operating system. The mobile phone 105 is capable of conducting conventional cellular communications with a base station 125 and mobile switching center (MSC) 130, which route calls and signaling information to and from the mobile phone 105 over a signaling network such as an SS7 network 135. The mobile phone 105 is also capable of conducting data communications over a packet-switched network 140 (e.g., the Internet) through a wireless access point 145 and/or through wireless data services supported by the base station 125 and a GGSN (Gateway GPRS support node) 127. Among other things, the application 120 on the mobile phone 105 can communicate with the server system 115 over the packet-switched network 140.

The server system 115 includes a ring-list server 150 that determines secondary destinations that should ring when primary calls are received at the mobile phone 105 in accordance with data stored in a ring-list database 155. The particular ring-list for a first incoming call can differ from the particular ring-list of a second incoming call based on any number of suitable parameters and criteria. In some instances, one or more of the parameters and criteria may be static (i.e., a particular secondary location is always used), while one or more of the other parameters and criteria may be dynamically determined at the time the incoming call is received, based on any suitable parameters associated with the incoming call, the primary destination, and the one or more secondary destinations. The secondary destinations may communicate with the server system 115 through Session Initiation Protocol (SIP), another digitized voice protocol, a circuit-switched connection, and the like, and the ring-list server 150 can initiate calls to the secondary destinations accordingly. For example, the ring-list server 150 can determine that one or more secondary destinations are reachable over the packet-switched network 140, such as a desktop computer 160, should ring and that one or more secondary destinations reachable over the SS7 network 135, such as a landline phone 165, should ring when an incoming call is directed to the mobile phone 105. Although only one packet-switched destination 160 is depicted, there can be multiple packet-switched destinations (e.g., a laptop computer, a tablet computer, VoIP Phone, and/or a mobile device) associated with the user that ring upon an incoming call. Packet-switched secondary destinations can have an application with a VoIP client installed that is capable of receiving calls and providing a ringing or other notification of an incoming call to a user. In addition, although only one conventional telephone destination is depicted, there can be multiple such destinations (e.g., a home landline phone and an office landline phone). In some cases, secondary destinations may be reached over both a packet-switched network and an SS7 or circuit-switched network. For example, the server system 115 may route calls across a packet-switched network to a circuit-switched interface in a location closer to the secondary destination to avoid long distance or inter-operator charges. The server system 115 also includes a VoIP server 170 that communicates with VoIP clients over the packet-switched network 140, a circuit-switched interface 175 that communicates with circuit-switched destinations, and a voice gateway interface 180 that receives forwarded calls at one or more phone numbers associated with the server system 115. In some implementations, the various servers and functionalities in the server system 115 can be combined or distributed across multiple servers. Furthermore, in some implementations the ring-list database can be distributed across the mobile phones 105, for example, at least some of the phones 105 can store the database portion of the ring-list relevant to incoming calls received at a particular phone.

A user of the multi-device calling service can define the various secondary destinations that are to ring, and the conditions under which each particular secondary destination will ring, through a web page or other interface provided by the ring-list server 150 or through the application 120 on the mobile device 105 (or an application on another device). Other interfaces include, but are not limited to Interactive Voice Response (IVR). The destinations and conditions are stored in the ring-list database 155 and can be subsequently modified as desired by the user. When the multi-device calling service is activated (initially or after being temporarily deactivated), the server system 115 can instruct the application 120 to register conditional call forwarding on busy to a phone number associated with the server system 115. In response, the application 120 can cause the mobile phone 105 to communicate with the mobile network so the HLR 110 for the mobile phone 105 registers the conditional call forwarding on busy feature for the mobile phone 105 with the phone number associated with the server system 115 as the forwarding destination number. Alternatively, the server system 115 can send a message to a user of the mobile phone 105 to manually register the conditional call forwarding feature. As another alternative, the server system 115 can communicate with the HLR 110 for the mobile phone 105 to register the conditional call forwarding feature or with the VLR/MSC 130 which is serving the mobile phone (or both). For example, the server system 115 may cooperate with a cellular service provider that can send call forwarding signaling to the HLR 110 or VLR.

Thereafter, when a calling party 185 places a call to the phone number associated with the mobile phone 105, the application 120 on the mobile phone 105 can detect the incoming call and send a notification of the incoming call to the server system 115 over the packet-switched network 140. In response to the notification, the ring-list server 150 can identify the secondary destinations that should ring for the incoming call in accordance with the ring-list and conditions stored in the ring-list database 155 and can place calls to the identified secondary destinations or otherwise notify the secondary destinations of the incoming call. If a user answers the call on one of the secondary destination devices, the server system 115 instructs the application 120 on the mobile device 105 to reject the call (e.g., by virtually selecting a call decline or ignore button), which causes the conditional call forwarding on busy feature to be triggered and thus to forward the call to the phone number associated with the server system 115. The forwarded call can then be received at the voice gateway interface 180 and connected to the secondary destination that answered the call using the VoIP server 170 or the circuit-switched interface 175 according to the answering destination.

When detecting an incoming call, the application 120 can also detect the caller ID for the calling party and include the caller ID in the notification of the incoming call sent to the server system 115. The server system 115 can use the caller ID received and send it as the caller ID of the voice calls it initiates to the secondary destinations on the ring-list.

Although the system 100 is described and depicted in the context of incoming calls directed to a mobile phone 105, the described techniques are not limited to mobile networks and mobile devices, but can be used on any phone client that can define in its subscription a call forwarding on busy as described above, replacing the HLR with the relevant component that stores the registration for the call-forwarding on busy. The server system should be able to receive notification of an incoming call, and issue a command to trigger call forwarding. In particular, the techniques can also be implemented for SIP clients, clients working in Voice over LTE (VoLTE), and other devices.

Figure 2:
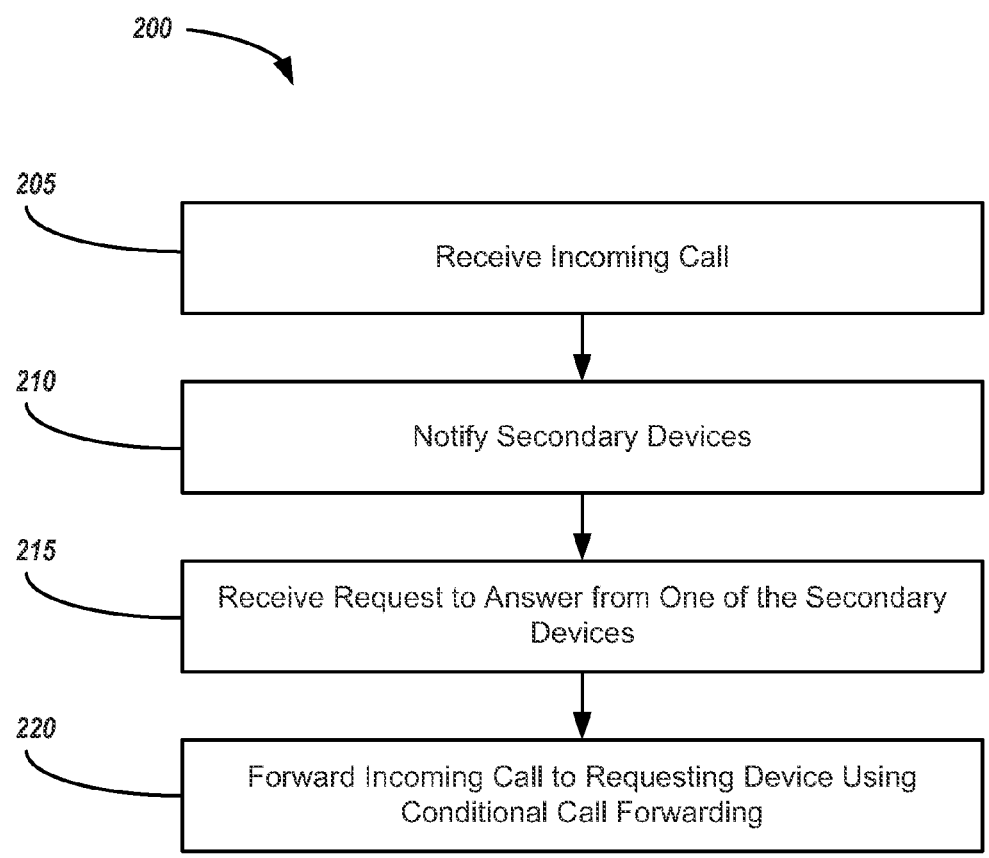
FIG. 2 is a flow diagram of a method for allowing a user to selectively answer an incoming call on one of a plurality of secondary destinations.

FIG. 2 is a flow diagram of a method 200 for allowing a user to selectively answer an incoming call on one of a plurality of alternative, or secondary, destinations. An incoming call is received at 205. The incoming call can be received at a called mobile device or another called telephone device, for example. One or more other devices (i.e., secondary devices) are notified of the incoming call at 210. The notification of the devices can be made over a data network or can be made by initiating a telephone call to one or more of the other devices. In some implementations, the one or more other devices are notified of the incoming call by first notifying a server of the incoming call, where the server then sends the one or more other devices a notification of the incoming call. A request to answer the incoming call is received from one of the other devices at 215. In response to the request to answer from one of the other devices (e.g., as identified by the server and indicated to the mobile device), the incoming call is forwarded (e.g., using conditional call-forwarding) at 220 to a server system from the mobile device, and subsequently bridged from the server to the already active outgoing call to the device that sent the answer request. The conditional call forwarding can be registered before or after the incoming call is received. For example, in some implementations, the conditional call forwarding can be registered after receiving and, in some instances, in response to receiving, the request to answer on one of the other devices. The conditional call forwarding can be triggered by sending a message from the server to the application on the mobile device to reject the incoming call, which triggers the call forwarding on busy to forward the incoming call to the server. As a result, the incoming call can be received at the server and then bridged from the server to the selected device.

Figure 3A:
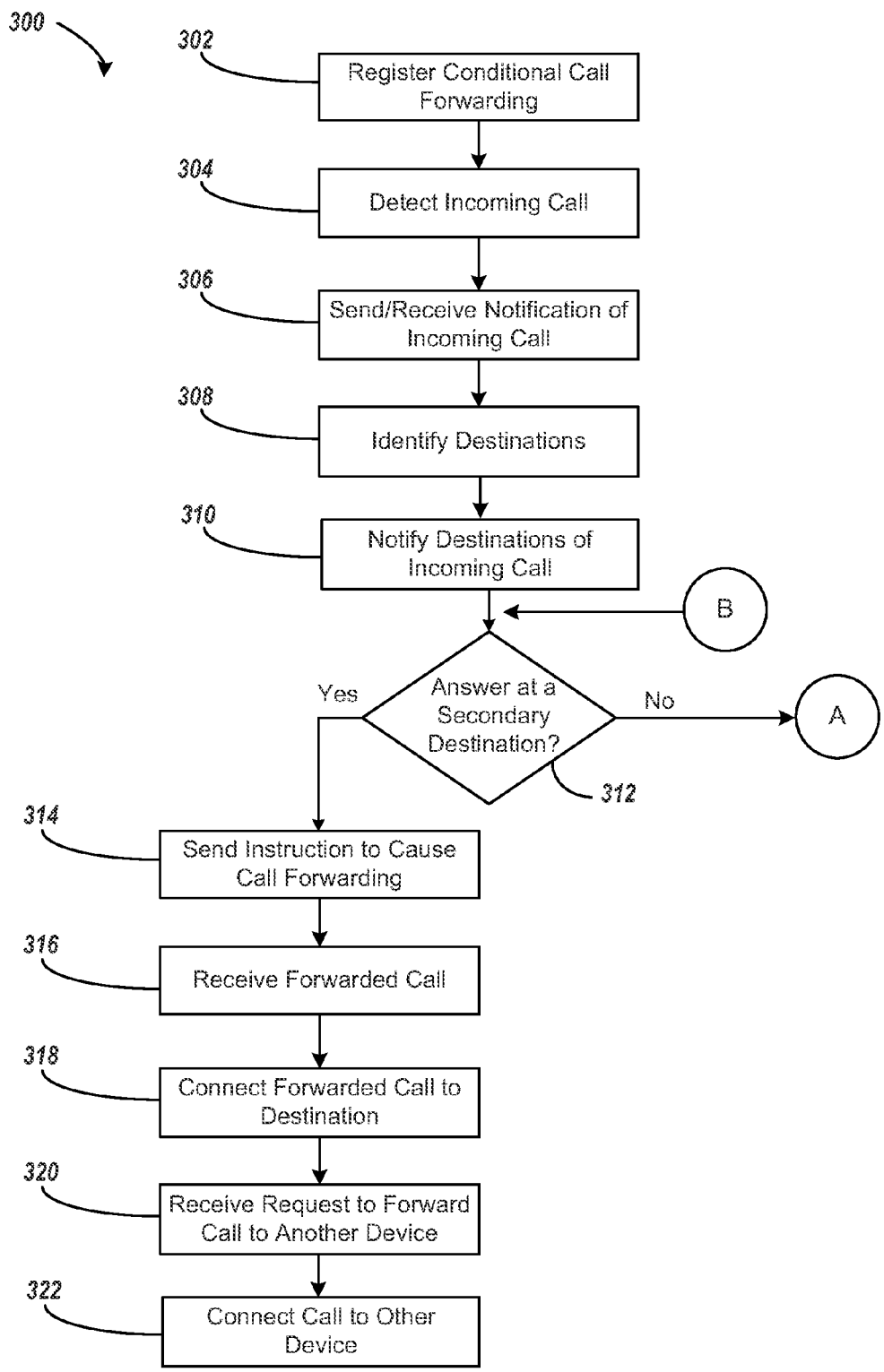
FIGS. 3A and 3B show a flow diagram of a more detailed method for allowing a user to selectively answer an incoming call on one of a plurality of secondary destinations.
Figure 3B:
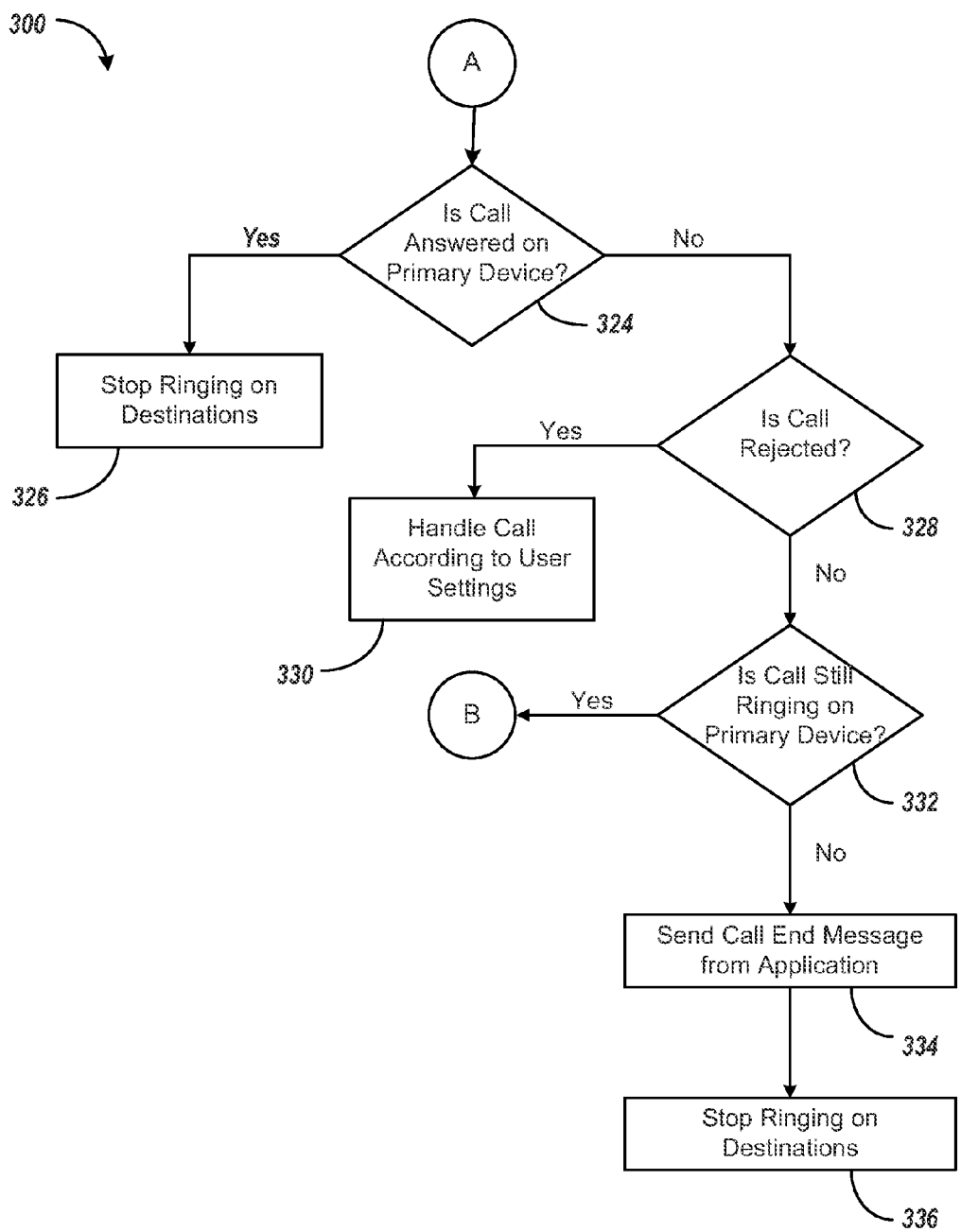

FIGS. 3A and 3B show a flow diagram of a more detailed method 300 for allowing a user to selectively answer an incoming call on one of a plurality of secondary destinations. Conditional call forwarding on busy for a user device is registered at 302. The conditional call forwarding can be registered by an application on the user device or by a server system. Conditional call forwarding can direct forwarded calls to a phone number associated with the server system. As one example, activating conditional call forwarding on busy can be achieved by dialing the prefix **\*\*67\* before the phone number associated with the server system, and terminating with #. In this example, if the server system phone number is (408)555-1111, the application on the user device can dial \*\*67\*4085551111#**. Different prefixes and techniques may be used, as appropriate with the corresponding provider and/or system, to perform the same operations described herein.

An incoming call to a telephone number associated with the user device is detected by an application on the user device at 304. A notification of the incoming call is sent by the application on the user device and received at a server system at 306. For example, the notification can be sent over a data network, e.g., a packet-switched network. One or more secondary destinations to which the call could potentially be connected are identified at 308. The one or more secondary destinations can be identified based on a ring-list for a user of the user device, which can depend on one or more default or customized parameters (e.g., time of day, current location of the user and/or the user device, etc.). The one or more secondary destinations are notified of the incoming call in response to the incoming call notification received from the application on the user device at 310. The notification can be in the form of a call setup request sent over a signaling network of a circuit-switched network or as a VoIP call setup message sent over a packet-switched network (e.g., depending on the communication capabilities of each destination).

A determination is made at 312 as to whether a request to answer the call at one of the secondary destinations has been received. For example, the request to answer can be a call answer on a circuit-switched network or a message that the VoIP call setup message is accepted at the secondary destination device. This notification can be an SIP answer, an SS7 call answer, or any other signal that the call is answered. In some cases, the request to answer the call on another device could be received from a device that differs from the secondary destination device (e.g., a user may be able to specify the secondary destination from the user device). Alternatively, a user can indicate he would like the call to continue and ring on an alternative secondary device, but stop ringing on its primary device. In this case the call is rejected on the user device, which triggers the call forwarding on busy towards the voice gateway interface of the server, and the server system rings the requested secondary destination and connects the call once the call has been answered on the secondary destination. Note that in this alternative scenario the call flow is a bit different, as the call is first forwarded to the server system, such that the call may arrive at the server system before it is answered on one of the secondary destinations. Once a secondary destination answers, the call is bridged from the server system to the appropriate secondary destination.

In response to receiving a request to answer the incoming call at one of the destinations, an instruction to perform one or more operations to cause forwarding of the incoming call to a telephone number associated with the server system is sent from the server system to the application on the user device at 314. For example, the one or more operations can include rejecting the call at the user device. In some implementations, the one or more operations can further include registering conditional call forwarding on busy before rejecting the call at the user device (e.g., in cases where conditional call forwarding on busy was not previously registered at 302 or where the conditional call forwarding was subsequently deactivated). As a result of rejecting the call at the user device, the call-forwarding on busy is triggered and the call is forwarded to the telephone number associated with the server system such that the forwarded call is received at the server system at 316. In particular, the rejection of the incoming call on the user device triggers a signal which in turn triggers the conditional call forwarding on busy condition, which as a result sends the incoming call to the phone number associated with the server system. The server system then answers the call received at the server system.

In some cases where the one or more operations include an instruction to reject the call at the user device, the server system can start a timer after issuing the instruction and, if the forwarded call does not arrive at the server system within a designated time, cancel the outgoing call that was answered at a secondary destination device. If this problem continues on subsequent calls, the registration for conditional call forwarding on busy may have been cancelled or changed. In this case, the server system can instruct the application on the user device to re-register conditional call forwarding on busy, or the user can be notified of a problem.

Assuming the forwarded call arrives as expected, the forwarded call is connected to the secondary destination at 318. For example, the server system can bridge the forwarded call to a circuit-switched connection between the server system and the destination or to a VoIP connection between the server system and the destination. In some cases, a request to forward the call to a different secondary destination is received at 320. For example, a user can forward the call to a different secondary destination using an application on the user device, on another of the secondary destination devices, or on another suitable device. In some instances, the user can forward the call back to the primary destination, if desired. In response to a request to forward the call to a different secondary destination, the call is connected to the different secondary destination device at 322. For example, the request can be received at the server system, which can establish a new call connection with the different secondary destination and bridge the originally forwarded call with the new call connection. In particular, the server system can route the call to another device by ringing the other device or devices, and once the user answers, the server system can reconnect the voice path to the answered device. Triggering the re-routing can be initiated by the user, the server system, the application on the user device, or an application on one of the other destination devices. For example, the server system can detect a low-quality call, or disconnection of the call, and in such event ring again on one or more secondary destination devices, as well as on the primary destination. In another example, a user may answer a call on a secondary destination such as a landline, but after a while wishes to continue the conversation—without disconnecting—but on his mobile phone. In such an example, the server can initiate a new call towards the primary destination. In such a case, once the user answers the new call, the server system can re-route the call to the answered device.

If a request to answer the call at one of the secondary destinations is not received at 312, method 300 continues at 324, where a determination is made as to whether the call is answered on the primary device. For example, the application on the user device can notify the server system if a user answers the call on the user device. If so, the server system can stop ringing at the secondary destinations at 326. For example, the server system can cancel call setup requests to the secondary destinations. If the call is not answered on the user device, a determination is made at 328 as to whether the call is rejected at the user device without receiving a request to answer at one of the alternative secondary destinations or is rejected at one of the secondary destinations. The call can be rejected at the user device, for example, if the user device is busy or if the user selects an option to ignore the call or to explicitly reject it. Similarly, a user can choose an option to ignore the call at one of the secondary destinations. If the call is rejected, the call can be handled at 330 according to default or user settings (e.g., returning a busy signal, forwarding to voicemail, or forwarding to some other destination). In the event that the call is rejected at the user device, the conditional call forwarding is triggered and the call is forwarded to the server system. The server system can determine that the call was rejected at the user device in such a situation based on receiving a forwarded call from the user device without having received a request to answer the call at one of the alternative secondary destinations. In addition, in some implementations, the application on the user device can send a message to the server system indicating that the call was rejected at the user device. If the call is not rejected, a determination is made at 332 as to whether the call is still ringing on the user device. If the call stops ringing on the user device, a message can be sent from the application on the user device to the server system at 334, and the server system can stop ringing on the secondary destinations at 336. If the call is still ringing, the process can return to 312 to determine if a request to answer the call at one of the secondary destinations is received.

When numerous user devices are using the multi-device calling feature described above, there may be many forwarded calls that can arrive at the server system from different user devices within a short timeframe, so it may be necessary to distinguish between the forwarded calls and associate them with the notifications of incoming calls and with the appropriate secondary destination(s). The server system can identify that a forwarded call received at the voice gateway interface is the same call that was reported and rejected by correlating an identifier on the call that was rejected with an identifier on the incoming call, where the identifier can be one of: a) the forwarded call received at the voice gateway interface bears a caller ID consistent with the caller ID as reported in the notification of the incoming call; b) in some networks, the call arrives at the voice gateway bearing a caller ID that is not the caller ID as reported, but rather a caller ID consistent with the MSISDN of the called phone—as if the call received by the voice gateway interface was originated by the called phone (in this case the server system can connect the incoming call based on the caller ID matching the MSISDN of the user); c) in some networks, the call is received with B number consistent with the registered phone MSISDN (or in SIP a diversion header consistent with the MSISDN of the registered phone); d) the phone number assigned for the call forwarding on busy for the registered phone can be assigned for a small group of phones, so that the chances of two rings at the same time is very low (and in the extreme a phone number is allocated for each registered phone so each registered phone forwards to calls to a different number at the voice gateway interface).

In some implementations, a time difference exists between the time the primary destination starts ringing and sends a notification to the server system and the time one or more secondary destinations ring. This delay is due to the time it takes to the notification to reach the server system, the call-setup time towards the secondary destinations, and the processing time by the various entities. This ring delay can be sometimes annoying to the user, as for example, the user would first hear a ring on his mobile phone, and after a second or two on his landline, when the user would prefer both to ring in the about the same time. In some implementations, the mobile application can instruct the primary device to delay the ring sound or vibrate of the primary device so that it would become more synchronized to the ring sound received on the secondary destination. For example, the mobile application can delay the ring sound of a mobile phone by one and half seconds, which would accommodate the time it takes for the system to ring on his landline. While the delay in the sound of the ring on the mobile device may be negligible for the user, the result is a more convenient experience as both the primary and secondary destinations will play the ring sound at almost the same time. In some implementations, further delays can be inserted on the generation of the call to some of the secondary destinations to allow the secondary destinations to ring at almost the same time. The ring delay on the primary device can be adapted to be dependent on the expected network delay, processing time, and call setup time, and can be changed from time to time based on current conditions or updated settings and/or requirements. For instance, on a Wi-Fi network the network delay from the primary device to the server system may be shorter compared to the network delay on a mobile data network. So in such a case the ring delay can be set to a larger value when the mobile is connected to a mobile network and to a shorter value when the mobile is connected to a Wi-Fi network. If the ring-list is empty, the ring delay can be eliminated. The ring delay may be implemented by muting the ring on the primary device by the mobile app and generating it after the delay by the mobile app.

A time difference exists between the time the user answers the call on a secondary destination until the incoming call is actually forwarded and bridged to the answered call. This delay is due to the fact that signaling of the answered call is sent back to the mobile application, with the network then needing to forward the call to the voice gateway interface and perform the bridging to the existing call. To make good use of this time, in some implementations, the caller name or caller ID associated with the incoming call is reported to the answering party at the secondary destination while the user is waiting for the incoming call to be bridged. Alternatively, the server system can cause music to be played. In the former case, the caller ID or caller name may be reported from the mobile application to the server system along with or in addition to the incoming call notification, where the caller ID or caller name can, in some instances, be converted to a voice format which can be played to the user, e.g., when answering but waiting for the connection to the forwarded incoming call to be completed. If, for example, the caller's name is "Marge Simpson" then the message that is played can be "Call from Marge Simpson." In other implementations, a user can record a message that would be played back when a specific caller is called. In this way, a user can answer a call on a secondary destination, such as a landline without caller ID, and still receive an identification of the caller. In yet another implementation, an identifier for the user of the primary device can be given in the played notification to the answering user on the secondary destination, and can include an identifier of who the call is for and/or directed. For instance, "Call for Homer" could be played upon answering and/or prior to the connection is made, or combined with previous message, "Call for Homer from Marge Simpson." The system can determine the correct identifier based upon the user entering it upon setup of the service, or as indicated from another database based on an identifier associated with the primary device.

As noted above, the secondary destinations on which incoming calls ring can be determined based in part on parameters that can be stored in association with the ring-list database. Similarly, registration of conditional call forwarding or selection of secondary destinations from the ring-list database to the ring-list can be based on parameters. The parameters can define conditions for the user device and/or for the secondary destinations that result in selection of secondary destinations and/or registration of conditional call forwarding. Conditions can also be defined for triggering the call forwarding and having an incoming call not ring on the primary device (and only on secondary destinations), or stopping the ring on the primary device while allowing the ringing on secondary devices to continue once certain conditions are met. For example, the parameters can be based on the location of the user device and/or destination device (e.g., to ring certain destinations when the user is at home or in the office), time of day, date, proximity of the user device to a secondary destination device, relative proximity of devices associated with the one or more secondary destinations, availability of a wired or wireless data connection for the user device or devices associated with the one or more secondary destinations, data communication speed or data communication latency for a secondary destination device, cellular connection status for the user device, recentness of activity on a primary or secondary device, rate of movement (e.g., to avoid ringing secondary destination devices when the user is traveling), calling party identification, battery level on the device associated with the primary and/or secondary destination (e.g., if a battery is below a certain threshold level, or if phone is powered off, a call may be set to ring at a particular device), an available Wi-Fi network list, cellular network identification to which a primary and/or secondary device is connected, the location area or cell ID the primary and/or secondary device is connected to, real-time input from a user that can choose a specific incoming call to ring at a desired secondary destination, as well as any other suitable parameters.

In one example implementation, the application on the user device can report the location of the user device to the server system (e.g., as determined by the GPS functionality of the device, system or connection information such as the nearest cellular base station, nearby Wi-Fi networks, other location service executing on the user device, or any other suitable means). If the location is in a desired range either from another device or from a pre-set location or range of locations, forwarding can be triggered or destination device can be added to the ring-list. In some instances, a to secondary destination can be added while the user device is near. Based on the location of the user device, the location of the secondary destination can be set to the location of the user device at the time of addition to the ring-list database. If the secondary location is known to be stationary or static, the location at the time of adding can be stored permanently (or at least until a change is set) for the secondary destination. The location in this instance can be a particular physical location, a range of locations (i.e., a particular cell in a mobile network), a calculated GPS coordinate, or a relative location. In some instances, a particular location can be defined by a list of Wi-Fi network identifiers or service set identifiers that are available at a particular location. That list can be stored and used to compare the later location of the user device in terms of the available Wi-Fi networks to the stored list of Wi-Fi networks associated with one or more secondary destinations. When one or more of the Wi-Fi network identifiers match, then the user device may be considered to in a suitable proximity to the secondary destination.

In another implementation, the application on the user device can include logic to determine if the location is in the desired range and trigger call forwarding accordingly. Alternatively or in addition, the logic can notify a server which secondary destinations should ring (the ring-list) in response to an incoming call. A web interface may be used to allow users to change the secondary destination devices that ring on an incoming call, and whether the service is activated and call forwarding is registered or not. This feature is useful in instances where a user leaves his user device at home where, upon reaching his office, the user can redefine the ring-list to receive incoming calls on a VoIP-based secondary location or on an office phone. In other implementations, the interface may be provided on or accessible via an application on the registered phone or on another device. In another example implementation, the user can dial a number from another phone and use an Interactive Voice Response system to alter the settings of the service. In another example implementation, the forwarding registration, the forwarding triggering, or the inclusion in the ring-list can depend on whether the registered phone is connected to a Wi-Fi network, a specific Wi-Fi network, or a Wi-Fi network that has a specific other secondary device connected to it. In any of the cases above, before registering the call forwarding or including the destination in the ring-list, the application on the user device can check the connection latency and speed over Wi-Fi to the Wi-Fi router, and the speed and latency of the connection to the voice gateway interface of the server system. Based on these values the application can run logic that determines if call forwarding should be registered or if a destination should be included in the ring-list. If the logic determines that the quality of the Wi-Fi internet connect is sufficient (i.e., the connection is fast enough and the latency is low enough), call forwarding can be registered. The application can also register forwarding after a criterion is satisfied over a period of time as a means to average out spikes in measurements or service.

In other implementations, the application can report the results of measurement and Wi-Fi location to the server system, which can manage the ring-list and/or call forwarding accordingly. This report can be included in the incoming call report sent to the server, or can be done in a separate message at another time. In some cases, the application may be unable to cancel forwarding or notify the server system. For instance, if Wi-Fi connectivity is lost but no cellular connectivity is gained, the application can monitor any Wi-Fi connections or cellular connection and upon reconnecting to one network or both, decide whether to keep forwarding or cancel it. Wi-Fi networks can also be used to determine location of landlines as destinations. For instance, the application can scan for Wi-Fi networks when a device is near a landline destination, and store this Wi-Fi list either in the application or in the server system in the ring-list database in association with this landline destination. The mobile application can scan for nearby Wi-Fi networks periodically or at certain events such as at the beginning of a ring for an incoming call, or at end of a call. Based on this list and the list of Wi-Fi networks near the primary device when an incoming call is received, the landline destination can be included in the ring-list, so the landline would effectively ring only when the user is near the landline destination. This parameter can be joined with other parameters, such as real-time user prompt. Wi-Fi location can also be used with other types of secondary destinations, including mobile and immobile destinations.

Triggering of forwarding or selection of destination devices can be determined based on the location of the secondary destination devices. In one implementation, applications running on a user's different devices can report those device's respective locations to the server system. When the secondary destination devices are within a certain threshold proximity to the registered phone, the server system can add them to a list of secondary devices to be called on incoming call. In another implementation, the applications on the devices can determine that the respective device is in proximity of the registered phone by using a protocol known in the art (e.g., Bonjour technology), and can send a request to the server system to register the appropriate secondary destination devices for incoming calls. Where the location of the secondary destination devices are static, then the location of the primary device with respect to the static secondary destination device can be calculated to determine the relative proximity of the primary device to the secondary destination device. Other techniques described above can also be used, including identifying Wi-Fi connections known to be present at the secondary destination with those currently available to the primary device.

In some cases, a second incoming call directed to the subscriber telephone number associated with a user device may be received while a first incoming call is ongoing on the user device. The techniques described above may be used to allow a user to answer the second incoming call at one of the other secondary destinations while the first incoming call continues. Moreover, the user may be able to connect the first incoming call and the second incoming call in a conference using an application on the user device or on one of the secondary destination devices. Another parameter that can be taken into account when determining the ring-list is whether the user is already in an ongoing call at a secondary destination. For example, if the user is an ongoing call, a second call that comes in can be given a busy signal, sent to voicemail, ring silently, or otherwise be used as a parameter in calculation of the ring-list.

A user may request initiation of an outgoing call using the subscriber telephone number as a calling party number while a first incoming call is ongoing. The outgoing call can be initiated from the user device or from one of the other secondary destinations while the incoming call is ongoing. In such a case, the incoming call and the outgoing call can be connected in a conference.

In some cases, some secondary destinations may be used by more than one user. Accordingly, when an incoming call rings on such a secondary destination, an indication of the called party (i.e., the phone number to which an incoming call is directed) and/or calling party can be displayed on the destination device.

In some implementations, the ring-list can also be used in cases where the phone is unreachable. For these cases, a conditional "call forwarding on unreachable" can be registered, for example, in response to a command received from the server system. Alternatively, the server system can register such call forwarding over a signaling network such as SS7. This call forwarding can be registered by the application on the user device similarly to the conditional call forwarding on busy. In GSM/Universal Mobile Telecommunications System (UMTS), for example replacing **67* with **62* (as discussed above in connection with activating conditional call forwarding on busy) can be used to register call forwarding on unreachable. Call forwarding is then triggered when the registered phone is out of coverage, and the call can be forwarded to the server system, which can notify other destinations of the call. In this implementation, the application on the user device will not notify the server system of an incoming call, and the server system will not instruct the application to reject the call. Instead, the call will reach the voice gateway interface of the server system together with the voice path without needing to reject the call at the user device. The server system does not need to immediately answer the call, though it can initiate calls to the secondary destination devices once the call is ringing on its voice gateway interface. If one of the secondary destination devices answers the call, the server system answers the call on the voice gateway interface and connects it to the answering secondary destination device. If the call stops ringing on the voice gateway interface of the server system, the server systems cancels the outgoing calls. The server system can differentiate between the cases of an incoming call reached due to call forwarding on unreachable and call forwarding on busy by allocating a different phone number associated with the voice gateway interface than is used for call forwarding on busy. The above call-flow is similar in case of call forwarding on busy when the call is set to ring only on secondary destinations and not on the primary destination, only that then there could be a call report notification sent to the server.

An example for usage for call-forwarding on unavailable is for example, when battery levels on the phone decrease beyond a certain point, or when the phone is entering an area with little, bad or no connectivity. The server system detects this situation and directs calls to secondary destinations on the ring-list, for example a landline or an application on the registered phone, thereby allowing the user to keep receiving his incoming calls.

Similarly, conditional call forwarding on non-answer and/or no service coverage can be used. This call forwarding can be issued by the mobile application similarly to the conditional call forwarding on busy, but by using 61 instead of 67. This call forwarding is triggered when the phone is not answering a call. Similar methods as those described above can be used to forward the call upon registration.

A user may periodically deactivate the service (i.e., when the user wishes to receive his calls only on his registered phone). Upon service deactivation, the application on the user device can cancel (de-register) the conditional call forwarding by issuing an appropriate prefix. For example, in GSM/UMTS, call forwarding can be canceled by replacing ** with ##. In this example, a conditional call forwarding on busy is disabled by dialing ##67#. Similarly, the server system may deactivate (deregister) call forwarding by issuing a "deregister conditional call forwarding on busy" command over SS7. Different networks might have different registration and deregistration codes for call forwarding, and might force registration of several kinds of forwarding together, directing the call to the phone number associated with the voice gateway interface. For instance, a single forwarding registration command might register call forwarding on both busy and call forwarding on no answer. It is worth noting, however, that the message and call flow is somewhat different in the two types of forwarding. In forwarding on busy, the registered phone rings, and the server system receives a notification of the incoming call the application on the phone (unless the ring-list is set to ring only on secondary destinations, then the call is rejected on the mobile before it is answered on one of the secondary destinations, where the flow is similar to call-forwarding on unreachable/no-answer). In forwarding on unavailable, the registered phone does not ring at all, and the call is received directly in the voice gateway interface without prior notice. If both cases use the same phone number associated with the voice gateway interface, then the server system can treat both cases the same (e.g., returning a busy signal or forward to call to a voice mail).

A server system can verify that call forwarding on busy was indeed registered by issuing a test call towards the subscriber and having the call rejected on the mobile phone or user device, for example, by the application running on the mobile phone. As a result of the call and rejection, the call forwarding on busy is triggered and the call is to be received at the server interface. Thus, the server can verify that the call forwarding on busy was indeed registered. In some mobile networks, the server system can also verify that the caller ID sent on the incoming call towards the mobile phone matches the caller ID received at the voice gateway interface of the server system. In other mobile systems, the caller ID received on the server system would match the phone number of the mobile phone, in that case the server can match these numbers to verify the successful registration.

The server system can further provide methods of detecting deregistration of call forwarding on busy. For example, if the call forwarding on busy is at some point de-registered or changed, when an incoming call is rejected the call would not arrive at the server system. The server system can detect that a call did not arrive at the voice gateway interface of the server. The server system can hold a counter for each such case, and when a threshold is reached a procedure can be performed to correct the call forwarding registration. First, the server can issue a test call as described above to verify that call forwarding is not registered. Next, the server can request registration of call forwarding on busy either from the HLR/VLR, from the mobile application, or from a user. As a final step, the server can verify that call forwarding is registered by issuing another test call and following the same pattern to confirm that the call if forwarded as expected. The test call procedure can be also initiated after the first-time registration of call-forwarding on busy is performed to verify that this registration was successful.

In some implementations, when a call rings on the mobile phone, the application on the user device displays a list of options the user can select for answering or otherwise handling the incoming call. For example, the options may include: send the call to voicemail, reject the call, transfer the call to a number of a secretary or a service that can get the message from the caller, sound a message to the call (e.g., "I'm busy, and I will call you later", etc. This list of options can also be displayed at other devices on the ring-list. When a user chooses an action other than answering the call, the application can send a message to the server system with the desired action. The server system can then issue a command to the application to reject the call at the mobile device. Alternatively, the call can be rejected as a response from the user's choice prior to receiving a command from the server system. If call forwarding on busy is registered, the call forwarding is triggered and the call is sent to and reaches the voice gateway interface of the server system, which can take the action desired by the user by forwarding the call to the desired secondary destination, playing a desired recorded message, or any other suitable action as selected.

The techniques described above can also be used if the user has no other secondary devices that the user wishes to receive calls on in parallel. For example, it might be desired to record calls by routing calls directed to a user device through the server system to a VoIP client application on the user device. As a call passes through the voice gateway interface, the voice gateway interface may record the call once it is answered. The call can also initially be sent to a recording system and then through a regular call to the primary device again, for example, through circuit-switch back to the mobile phone where the user can record the call.

In UMTS/GSM mobile networks, for example, a typical circuit-switched call-route of a call that was answered on a secondary destination is from the Gateway-MSC (GMSC) towards the MSC/VLR serving the registered phone, continuing from there again through the GMSC to the voice gateway interface of the server system, and from there towards the secondary destination. A possible optimization is that once the above signaling path is determined, the GMSC can shorten the voice path by connecting directly the incoming call to the GMSC with the outgoing call towards the voice gateway interface that passes through the GMSC, thus saving the routes to and from the MSC/VLR. The GMSC can detect this situation and use, for example, a Release Link Trunk command (RLT). In other network topologies other messages or shorting of paths occur, keeping the principle that the voice path to and from the MSC/VLR can be optimized out of the call voice-path.

In an alternative implementation of the multi-device service, the service provider of the primary destination—rather than the application on the user device at the primary destination—notifies the server system with a call notification upon indication that there is an incoming call. As a result, in parallel to the call ringing at the primary destination, the incoming call would also ring at the voice gateway interface of the server system. The server system, based on a defined ring-list, would ring on one or more secondary destinations, taking into account all static and dynamic parameters. If the call is answered on one of the secondary destinations, the server system answers the call leg incoming at the server system. If the call stops ringing in the server system, the server system stops the outgoing calls. In such an implementation, the mobile application tracks the location of the primary device or reports location information on the primary device, and the server system tracks the device location. The ring-list is updated based on the location or as indicated by the mobile application. When a relevant parameter changes, the mobile application can notify the server system. For instance, when the ringer state changes to Vibrate, Silent, or Ringing—the mobile application can inform the server system so these parameters can be taken into account by the server system in calculating the ring-list. Alternatively, the ring-list can be calculated by the mobile application. Then, the server system communicates with the mobile application to receive the ring-list prior to ringing secondary destinations with the call. In another implementation, at the server system a notification is also received from the mobile application, either at the time the call is ringing or prior to the call. For example, the server system receives notifications from both the service provider and the mobile application of the incoming call, and uses information on parameters reported by the mobile application, such as the location of the primary device and ringer state: ringing/vibrate/silent to determine one or more secondary destinations from the plurality of potential secondary locations defined in the ring-list database. The server system then uses parameters reported from the mobile application to determine the ring-list. For example, a secondary destination is included in the ring-list if the primary device is in relatively close proximity to that secondary destination as reported by the mobile application and if phone ringer state is set to ringing. Once a secondary destination is answered, the server system can notify the service provider of the answered call, so the service provider stops the calling part to towards the primary destination and connect the call towards the server system. In such an implementation, conditional call forwarding does not have to be registered; rather, a notification of the call towards the server system in parallel to the primary device is registered with the relevant service provider servers.

The location of a landline destination can be determined when a user chooses to add a landline destination to the ring-list database. The mobile application can ask the user if the user is next to the landline, and store the mobile location in the ring-list database as the location of the landline. The determination of the landline's location may be determined when added or at a later time. Alternatively, the location of the landline can be manually entered by the user (e.g., by manual entry to an application or web-based interface) or by looking up the address or location associated with the landline in an existing database or phone book. Still further, as previously described, the landline's location can be based on Wi-Fi networks or mobile communication cells available to the user device when the landline is added to the ring-list database. In future calls, the ring-list can include the landline destination based on proximity of the mobile to the landline's location as recorded. Where available Wi-Fi networks are used for proximity, the mobile application on the user device can report the current Wi-Fi networks available to the user device and report those to the server. By matching one or more of the available Wi-Fi networks to those identified as in proximity to the landline, the server system can match locations based on the overlapping Wi-Fi networks and include a corresponding landline in the ring-list. This allows users increased convenience—limiting the possibility that someone else might answer the user's private calls, as the landline can be set to ring in parallel to the mobile only when the user is next to it. Similarly, the landline can be set to ring in parallel only if the user device's ringer is set to ringing, thereby avoiding disturbing the user by calling the user's landline in cases where the user chose silent or vibrate state on his primary device.

When a user chooses to add a landline destination, he can also be prompted if the line the user is adding is behind an organizational extension that requires further dialing. In such cases, the user can enter the extension number or other further dialing information so the server system would further send the appropriate dual-tone multi-frequency (DTMF) on the outgoing call to this landline destination so the call would ring on the user's extension. The server system can detect an answer by the user on his office extension, for example, by using sound or voice recognition to detect an answer sound. As an alternative, the user may be asked to dial a digit or sequence of digits, such as prompting the user "dial 1 to answer the call." When the user dials 1 the server system employs DTMF recognition to detect an answer.

Allowing the user to choose a sequence of digits can be useful in other situations as well, for instance to avoid answering calls by unintended recipients at a secondary destination. For instance, a business user might want to add a home destination, but wouldn't like children to answer a business call at home. In one implementation, the user can be prompted at the time of defining the secondary destination on the mobile application to enter a PIN code or password. Then, when the call rings in parallel on his primary destination and secondary destination and the phone is picked up at the secondary destination, a message can be played towards the secondary destination by the server system asking for the PIN code or password. Only once the PIN code or password has been entered will the server system send the instruction to perform one or more operations to cause the forwarding of the call towards the voice-gateway interface of the server system. In some instances, the PIN code or digit typing for answering a call can be combined with an identification of the primary device upon answering the call on secondary destination. For instance, a message can be played on the secondary destination once answered: "Call for Homer, press 1 to answer." In an alternative implementation, the caller can hear a voice message or music while waiting for the user to choose to answer the call by pressing the digit sequence. Other digits or sequences can also be used to send the call to voicemail or indicate a forward to another destination or be used to alter the ring-list for the call.

The location of any primary or secondary destination can be determined based on a sampling of locations. Sampling of locations can be done in at least two methods: a one-time sampling or an on-going sampling. In a one-time sampling, when a secondary destination is added, the current location of the secondary destination is stored as a static location. In future considerations and proximity comparisons, the initial location stored in the database is used as the location of that destination. That initial location can be determined in any suitable method, such as by confirming that a user device is nearby to the destination and using the user device's location to set the destination's location. For devices with mobile capabilities, on-going sampling may be used to provide up-to-date information on the location of the destination and associated devices. Location information associated with those destinations can be updated on a periodic or recurring basis, providing the ring-list and associated logic with current information for performing the determinations on where a particular incoming call should be forwarded.

In addition to receiving calls on devices using VoIP clients, users can also generate outgoing calls from applications on secondary devices in accordance with additional aspects of this specification. The term "multi-device application" is used here to identify applications running on secondary destinations with outgoing calls capability as described previously. Outgoing calls can be facilitated using a server system that, in some implementations, can be combined with the server system described above for forwarding incoming calls to secondary destinations. For example, a user can initiate dialing a party from a multi-device application on the primary or secondary device. The multi-device application notifies the server system of the request for the call. If the called party also subscribes to the services of the server system, the server system sends a ring notification to a multi-device application running on one or more devices of the called party user. When the called user answers the call on one of these devices, the software running on the device and the server system interact to establish a call. If the call is answered on a secondary device of the called party user, a VoIP call is established between the multi-device application on the secondary device of the called party user and the calling device's multi-device application using the server system. If the call is answered by the called party user on a his primary device through the installed multi-device application, the server system provides the application with a phone number associated with a voice gateway interface, and the multi-device application causes the primary device to issue a phone call to the provided phone number associated with the voice interface of the server system. When the call reaches the server system on the voice gateway interface, the server system connects the call with the calling party. If the calling party user dialed from a secondary device, then a VoIP session is established between the secondary device and the server system. If the user dialed from a primary device, the server system allocates a phone number associated with the voice gateway interface to the call and provides this phone number to the multi-device application running on the calling device. The application initiates a call to the provided phone number. Once the server system receives the call on the voice gateway interface, the call is connected to the call from the called party device. It should be understood that if one of the users is using a primary phone, a VoIP call can be established instead of a regular call as described above. If the server system has phone numbers of both the calling party and called party of a call, the server system can instruct either the application running on the calling device or called device to establish a call directly to the other user's phone number. As the call is established, the application running on the device receiving the call can answer it without further user intervention.

FIG. 4 illustrates a communication system 400 that facilitates establishing calls using applications on calling party and called party devices. The system 400 includes a first user device 405 having an installed application 410 and a second user device 415 having an installed application 420. The first user device 405 is associated with a first user and the second user device 415 is associated with a second user. Both applications 410 and 420 communicate over a packet-switched network 425 (e.g., the Internet) with a server system 430 to set up calls between the devices. In addition, at least the second user device 415 is capable of communicating over a telephone network, such as with a base station 435 that is connected to an SS7 network 440. The server system 430 is also connected to the SS7 network and can receive calls at one or more phone numbers associated with the server system 430 through a voice gateway interface 445. The server system 430 also includes a call setup server 450 used to facilitate establishing calls between the first user device 405 and the second user device 415. The applications 410 and 420 are adapted to initiate voice calls over a VoIP connection. At least the application 420 on the second user device is also adapted to initiate voice calls over a telephone network (e.g., by accessing cellular telephone functionality in the user device separate from the application 420). Although the first user device 405 is depicted as a desktop computer, the first user device could also be a phone or other device (e.g., laptop or tablet computer). Similarly, although the second user device 415 is depicted and described as a cellular phone, the second user device could also be a landline phone, for example.

When a user of the first user device initiates a call using the application 410 directed to the second user, the application sends a call setup request through the packet-switched network 425 to the call setup server 450. In response, the call setup server 450 sends a call setup message to the application 420 on the second user device 415. In some implementations, the call setup server 450 can send a call setup message to multiple devices and/or destinations associated with the second user. The application 420 on the second user device 415 can provide a notification (e.g., a ring, vibration, and/or text) of the incoming call through a user interface on the second user device 415. If the second user answers the call on the second user device 415, the application 420 sends an answer message to the call setup server 450. In response, the call setup server 450 instructs the application 420 to initiate a telephone call to a telephone number associated with the voice gateway interface 445. The application 415 on the second user device 420 is adapted to place a call to the voice gateway interface 445 of the server system 430 using the telephone number. When the call is received by the server system 430, the server system 430 connects the received call with a voice connection between the application 410 on the first user device 405 and the server system 430 to establish a call connection between the first user device 405 and the second user device 415. In some cases, the voice connection between the application 410 on the first user device 405 and the server system 430 is a VoIP connection. In other cases (e.g., if the first user device is a phone using a non-VoIP application or functionality), the voice connection can be a telephone call, which can be established by instructing the first user device to call a telephone number associated with the voice gateway interface 445. After the call connection is established, one or both of the legs of the call connection can be forwarded to alternative user devices and/or applications in a manner similar to described above in connection with the discussion of multi-device calling features.

Figure 5:
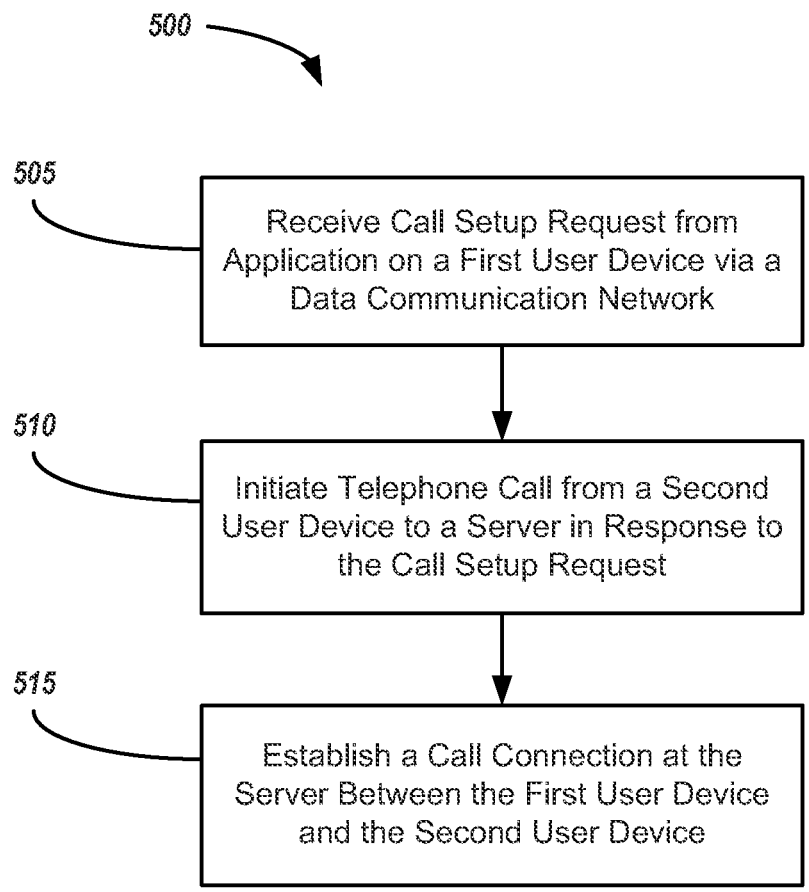
FIG. 5 is a flow diagram of a method for establishing a call connection using call setup communications with a server.

FIG. 5 is a flow diagram of a method 500 for establishing a call connection using call setup communications with a server. A call setup request is received at 505 via a data communication network from an application on a first user device to set up a call with a second user device. The call setup request can be received by the server system, which can send a message to an application on the second user device in response to the call setup request. The message can include an identification of a telephone number associated with the server system for the application on the second user device to call. Alternatively, the call setup request can be received by the application on the second user device. A telephone call from the second user device to a telephone number associated with a server system is initiated via the mobile network of the second user in response to the call setup request at 510. The telephone call is initiated by an application on the second user device. The telephone call can be initiated in response to a user interaction with the second user device indicating a request to answer the call. A call connection between the first user device and the second user device is established at the server system at 515. The call connection is established using the telephone call between the second user device and the server system and using a communication path between the server and the first user device. The communication path between the server system and the first user device can be a packet-switched communication path or a telephone call from the first user device to a telephone number associated with the server system. In the case of a telephone call, the telephone call can be initiated by the application on the first user device.

In one instance of the previously described systems and methods, a graphical user interface ("GUI") element referred to herein as a "Pre-Call Screen" may be displayed by the mobile application during the time the incoming call is ringing on the primary device. The Pre-Call Screen can display to the user some or all of the secondary devices that currently ring in parallel to the primary device. Additionally and/or alternatively, the Pre-Call Screen can also display secondary devices that currently do not ring in parallel to the primary device. The mobile application can determine which secondary devices ring and which do not ring based on the ring-list database by interacting with the server system, or by having a local storage of information of the ring-list database. The Pre-Call Screen can allow the user to interact with the GUI and the mobile application, thereby allowing the user to change the state of a secondary destination from ringing to not-ringing, as well as allowing the user to change the state of a secondary destination from not ringing to ringing. In other words, the Pre-Call Screen allows the user to change the ring-list in real-time during the time the call is ringing on the primary device. As a result from the user interaction, the mobile application contacts the server system to start a new outgoing call (i.e., when a non-ringing secondary destination is selected via the interface) or to stop an outgoing call to a particular secondary destination based on the updated ring-list defined by the user as compared to the ring-list prior to the user interaction. In some implementations the Pre-Call Screen appears only on the primary device, while in others the Pre-Call Screen can appear on one or more of the secondary destinations and their associated devices.

In one implementation, a GUI element referred to herein as an "In-Call Screen" is displayed by the mobile application on the primary device once a call has been answered on a secondary device associated with a secondary location. The In-Call Screen can display call-related information such as the time of the call, the caller ID, and the identification of the secondary destination in which the call has been answered, among others. Further, the In-Call Screen can allow user interactions to be performed with the current call, such as allowing the user to end the call or pull the call from the secondary destination back to the primary destination at the primary device. When a call is answered on a secondary destination, the server system can notify the mobile application so the mobile application can enable the In-Call Screen display. Once the call has been completed, the server system notifies the mobile application of the call's completion so the mobile application can then close the In-Call Screen.

The In-Call Screen can display additional suitable content. For example, the In-Call Screen can also display additional information describing or associated with the caller or calling party, such as information retrieved from social sites about the caller or information related to recent interactions the user had with this caller. The In-Call screen can also display advertisements on the In-Call Screen. The In-Call Screen can also include the ability to send a text message to the other side of the conversation or open a text-sending GUI to allow text-based or other alternative and/or additional interactions with the caller. The In-Call screen is useful also in case the secondary device has limited ability to display information, such as if the secondary destination is a landline.

When a call is answered on a secondary device associated with a secondary destination, the primary device would naturally see the call as rejected. However, listing the call as rejected in the primary device's call log can confuse the user. In one implementation, the mobile application can update the call log on the primary device with information to note that the call was actually answered, but at a secondary destination. The information may also include the particular secondary location where the call was answered, for example, "Answered on home landline." In some instances, the call log may provide information as to the other secondary locations at which the call was forwarded. The call duration can also be updated based on the duration of the call as received from the server system or as calculated by the mobile application from the initial call notification received from the server system and the end of call notification received from the server system.

The various GUI elements described above can also allow the user to interact with the call and ask for value-added services. For example, a GUI element can allow the user to choose to record the call, transcribe a call to text, or perform any number of alternative and additional services.

In an alternative implementation, the server system operations described herein may be performed by a mobile, landline, or VoIP operator or communications service provider, such that incoming calls to subscribers of the service need not reach the user device (i.e., the subscriber's device) before any call forwarding and/or parallel call to secondary destinations is performed. In such instances, and using at least some of the similar techniques described above, incoming calls can be identified at the operator when a user is registered to this parallel-call service. In these instances, the incoming call may not need to ring at the user device before being sent to the one or more secondary devices. Instead, the mobile operator may be able to assess the user devices location, connectivity status, ringer state (i.e., on, vibrate, off, or low, among others), and any other user device information, while also using the ring list to determine the desired status of one or more secondary destinations and devices. Based on any combination of defined parameters or criteria, including but not limited to the relative location of the user device to one or more of the secondary destinations and the user device's ringer state, the operator can either issue a call to both the primary destination and one or more secondary destinations in parallel, or the operator can decide to forward the incoming call to one or more secondary destinations without ringing at the primary destination of the user device. In both instances, calls answered at one of the destinations (either the primary or one of the secondary destinations) can cause the operator to cancel the other non-answered calls. In either instance, the ring-list may be calculated at the operator/provider's internal systems. The ring-list database may also be defined or stored locally at the user device and synchronized with the operator's corresponding systems.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions tangibly stored on a computer-readable storage device for execution by, or to control the operation of, data processing apparatus. In addition, the one or more computer program products can be tangibly encoded in a propagated signal, which is an artificially generated signal, e.g., a machine-generated electrical, optical, or electromagnetic signal that is generated to encode information for transmission to suitable receiver apparatus for execution by a computer. The computer-readable storage device can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a cross-platform runtime environment, or a combination of one or more of them. In addition, the apparatus can employ various different computing model infrastructures, such as web services, distributed computing and grid computing infrastructures.

A computer program (also known as a program, software, software application, application, mobile application, app, mobile app, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, mobile device, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse, touch screen, or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other.

While this specification contains many implementation details, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the invention have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving, at a server system, a notification of a primary incoming call directed to a subscriber telephone number associated with a user device, where the notification received at the server system is sent by the user device after the primary incoming call starts ringing at the user device, and
   where a registration of a conditional call forwarding on a subscription associated with the subscriber telephone number with a destination of the forwarding being set to the telephone number associated with the server system was completed prior to receiving the notification of the primary incoming call;
   notifying, by the server system, one or more secondary destinations of the primary incoming call based on the notification, where the notification is made by the server system while the primary incoming call is concurrently ringing at the user device;
   sending, from the server system, an instruction designated to the user device to perform one or more operations to trigger forwarding of the primary incoming call to a telephone number associated with the server system, wherein the instruction is only sent after notifying the one or more secondary destinations of the primary incoming call,
   wherein the one or more operations include relecting the primary incoming call at the user device, and wherein a registration of a conditional call forwarding on busy is performed prior to the reiection of the primary incoming call at the user device;
   receiving the forwarded incoming call at the server system; and
   connecting, by the server system, the forwarded incoming call to a particular secondary destination.

2. The method of claim 1 wherein the instruction to perform one or more operations is sent to an application on the user device, and wherein the instruction to perform one or more operations instructs the application to reject the primary incoming call in response to receiving the instruction to perform one or more operations, wherein rejecting the primary incoming call triggers the conditional call forwarding on busy.

3. The method of claim 1 wherein the registration of conditional call forwarding on busy is requested by the server system to a server managing the subscription associated with the subscriber telephone number.

4. The method of claim 1 wherein the request to register the conditional call forwarding on busy is requested from the application on the user device, wherein the request is associated with the subscription service provider associated with the user device.

5. The method of claim 4 wherein an instruction is sent from the server system to the application on the user device requesting the application to trigger conditional call forwarding.

6. The method of claim 1 wherein the one or more secondary destinations include at least one of a voice over Internet Protocol (VoIP) destination or a circuit-switched destination.

7. The method of claim 1 wherein the one or more secondary destinations include a VoIP application on the user device.

8. The method of claim 1 wherein a calling party identifier is associated with the primary incoming call and the notification of the primary incoming call includes the calling party identifier, wherein the server system associates the forwarded incoming call with the particular secondary destination based on a match between the calling party identifier included in the notification of the primary incoming call and a calling party identifier associated with the received forwarded incoming call.

9. The method of claim 1 wherein a calling party identifier is associated with the primary incoming call, wherein the server system generates a voice message associated with the calling party identifier, and wherein the server system plays the generated voice message at the particular secondary location in response to a request to answer the forwarded incoming call.

10. The method of claim 1 wherein the server system associates the forwarded incoming call with the particular secondary destination based on an identifier corresponding to the subscriber telephone number associated with the received forwarded incoming call.

11. The method of claim 1 wherein the server system associates the forwarded incoming call with the particular secondary destination based on the telephone number associated with the server system at which the forwarded incoming call is received.

12. The method of claim 1 wherein a calling party identifier is associated with the primary incoming call and the notification of the primary incoming call includes the calling party identifier, and wherein notifying one or more secondary destinations of the primary incoming call includes providing the one or more secondary destinations with a calling party identifier consistent with the calling party identifier associated with the primary incoming call.

13. The method of claim 1 further comprising:
receiving, at the server system, a request to forward the forwarded incoming call to an alternative destination after connecting the forwarded incoming call to the particular secondary destination, the alterative destination different than the particular secondary destination; and
connecting the forwarded incoming call to the alternative destination in response to the request to forward the forwarded incoming call.

14. The method of claim 13 wherein the request to forward the forwarded incoming call to the alternative destination is received from an application on the user device.

15. The method of claim 13 wherein the request to forward the forwarded incoming call to the alternative destination is received from an application on a device associated with one of the one or more secondary destinations.

16. The method of claim 1 further comprising registering conditional call forwarding for the subscriber telephone number to the telephone number associated with the server system, where the secondary destinations are based on one or more parameters for the user device or the one or more destinations, with the parameters selected from the group consisting of location of the user device or other device, time of day, date, proximity of the user device to another device, relative proximity of devices associated with the one or more secondary destinations to the user device, availability of a wired or wireless data connection for the user device or secondary devices being associated with these data connections, availability of a wired or wireless data connection for the devices associated with the one or more secondary destinations or secondary devices being associated with these data connections, data communication speed, data communication latency, cellular connection status, recentness of activity on device, rate of movement, a ringing state of the user device, a cellular ID to which the user device is connected, and a list of Wi-Fi networks in proximity of the user device.

17. The method of claim 1 further comprising notifying the one or more secondary destinations based on one or more parameters, wherein the one or more parameters include:
determining a physical location of the user device and a physical location of the one or more secondary destinations; and
notifying the one or more secondary destinations within a pre-determined distance from the user device.

18. The method of claim 17, wherein determining the physical location of the user device and the one or more secondary destinations is based on sampled location information associated with the user device and the one or more secondary destinations.

19. The method of claim 1 further comprising notifying the one or more secondary destinations based on one or more parameters, wherein the one or more parameters include a parameter based on whether the user device is in close proximity to the one or more secondary destinations, wherein close proximity is determined by:
identifying a set of wireless networks available to the user device;
identifying a set of wireless networks associated with one or more secondary destinations; and
notifying the one or more secondary destinations associated with at least one wireless network available to the user device.

20. The method of claim 19 wherein the set of wireless networks associated with at least one of the one or more secondary destinations is determined based on location of the user device at a time when the at least one secondary location is added as a potential secondary destination.

21. The method of claim 1 further comprising notifying the one or more secondary destinations based on one or more parameters, wherein the one or more parameters include a determination of a whether the user device is one of a silent, vibrate, or ringing ringer state.

22. The method of claim 1 further comprising notifying the one or more secondary destinations based on one or more parameters for the user device or the one or more secondary destinations, with the parameters selected from the group consisting of location of the user device or other device, time of day, date, availability of a wired or wireless data connection for the user device, availability of a wired or wireless data connection for the devices associated with the one or more secondary destinations, data communication speed, data communication latency, cellular connection status, recentness of activity on device, rate of movement, a ringing state of the user device, and a cellular ID to which the user device is connected.

23. The method of claim 1 wherein the user device is a mobile device and an application on the mobile device communicates with the server system to update a list of devices to be notified of incoming calls.

24. The method of claim 1, wherein the primary incoming call comprises a first incoming call, the method further comprising:
receiving a second incoming call directed to the subscriber telephone number while the first incoming call is ongoing; and
allowing a user to answer the second incoming call at one of the other secondary destinations while the first incoming call is ongoing.

25. The method of claim 24 further comprising connecting, at the server system and in response to a user request, the first incoming call and the second incoming call in a conference.

26. The method of claim 1 further comprising:
receiving a request at the server system to initiate an outgoing call using the subscriber telephone number as a calling party number while the first incoming call is ongoing; and
initiating, by instructions from the server system, the outgoing call from one of the other secondary destinations while the incoming call is ongoing.

27. The method of claim 26 further comprising connecting, at the server system and in response to a user request, the incoming call and the outgoing call in a conference.

28. The method of claim 1 further comprising:
receiving a request at the server system to initiate an outgoing call using the subscriber telephone number as a calling party number while the first incoming call is ongoing; and
initiating, by instructions from the server system, the outgoing call on the user device while the incoming call is ongoing.

29. The method of claim 28 further comprising connecting, at the server system and in response to a user request, the incoming call and the outgoing call in a conference.

30. The method of claim 1 further comprising providing an indication of the called party on at least one of the other secondary destinations.

31. The method of claim 1 further comprising using the server system to handover the incoming call from a device associated with the particular secondary destination used to answer the incoming call to another device associated with one of the secondary destinations.

32. The method of claim 1 wherein the server system is associated with a mobile service provider.

33. The method of claim 32, wherein the one or more secondary destinations are determined based on a location of the user device.

34. The method of claim 1, wherein the one or more notified secondary destinations are a subset of a plurality of potential secondary destinations.

35. The method of claim 1, wherein the user device is a mobile device.

36. A non-transitory computer storage medium encoded with a computer program, the program comprising instructions that when executed by data processing apparatus cause the data processing apparatus to perform operations including:
sending, from a user device and to a server system, a notification of an incoming call directed to a subscriber number, wherein the notification is sent responsive of the incoming call ringing at the user device, and
wherein the server system is further adapted to notify one or more secondary destinations of the incoming call based on the notification and is further adapted to receive in return a request to answer the incoming call from one of the secondary destinations, and
where a registration of a conditional call forwarding on a subscription associated with a subscriber telephone number with a destination of the forwarding being set to the telephone number associated with the server system was completed prior to sending the notification of the incoming call; and
receiving, at the user device, an instruction from the server system to perform one or more operations to cause forwarding of the incoming call while it is ringing at the user device to a telephone number associated with the server system,
wherein the one or more operations include rejecting the incoming call at the user device, and
wherein the registration of the conditional call forwarding on busy is performed prior to the resection of the incoming call at the user device,
wherein the server system is further adapted to connect the forwarded incoming call to the requested secondary destination which sent the request to answer the call.

37. The computer storage medium of claim 36 wherein the instruction is received from the server system in response to the server system receiving a request to answer the incoming call at one of the secondary destinations.

38. The computer storage medium of claim 36 further comprising receiving an instruction to register conditional call forwarding for the subscriber telephone number to the telephone number associated with the server system, and wherein the conditional call forwarding is registered before receiving the instruction to perform one or more operations to cause forwarding of the incoming call.

39. The computer storage medium of claim 38 wherein the operations further include rejecting the incoming call to cause forwarding of the incoming call.

40. The computer storage medium of claim 36 wherein prior to the one or more operations indicated by the received instruction a registration of call forwarding is performed with the destination set to the telephone number associated with the server system.

41. A system comprising:
a user device associated with a subscriber telephone number, the user device having an application adapted to send a notification of an incoming call directed to the subscriber telephone number, after the incoming call starts ringing at the user device; and one or more servers, wherein the one or more servers are adapted to:
- receive the notification of the incoming call from the user device, where the notification received by the one or more servers is sent by the user device after the incoming call starts ringing at the user device, and
where a registration of a conditional call forwarding on a subscription associated with the subscriber telephone number with a destination of the forwarding being set to the telephone number associated with the one or more servers was completed prior to receiving the notification of the incoming call;
- notify one or more secondary destinations of the incoming call based on the received notification while the incoming call is concurrently ringing on the user device;
- identify a request to answer the incoming call at one of the secondary destinations;
- send an instruction to the application on the user device to perform one or more operations to cause forwarding of the incoming call to a telephone number associated with the one or more servers,
wherein the one or more operations include rejecting the incoming call at the user device, and
wherein the registration of the conditional call forwarding on busy is performed prior to the rejection of the incoming call at the user device;
- receive the forwarded incoming call; and
- connect the forwarded incoming call to the secondary destination identified in the request.

42. The system of claim 41 wherein the one or more servers are further adapted to request registration of conditional call forwarding for the subscriber telephone number to the telephone number associated with the one or more servers.

43. The system of claim 41 wherein the one or more operations include triggering conditional call forwarding for the subscriber telephone number to the telephone number associated with the one or more servers and the application is further adapted to register conditional call forwarding for the subscriber telephone number.

44. The system of claim 41 wherein the instruction is sent in response to the receiving the request to answer the incoming call at one of the secondary destinations.

45. The system of claim 44 wherein the one or more operations include rejecting the incoming call and wherein the application is further adapted to reject the incoming call at the user device in response to the instruction.

46. The system of claim 41 wherein the one or more servers are further adapted to identify the one or more secondary destinations to notify of the incoming call.

47. The system of claim 46, wherein identifying the one or more secondary destinations to notify of the incoming call includes:
- identifying at least one parameter associated with at least one of the incoming call and at least one of the secondary destinations; and
- generating a ring list of the one or more secondary destinations based at least in part on the at least one identified parameters, wherein the generated ring list includes the one or more secondary destinations to notify of the incoming call.

* * * * *

UNITED STATES PATENT AND TRADEMARK OFFICE
CERTIFICATE OF CORRECTION

PATENT NO.         : 9,578,177 B2                                     Page 1 of 1
APPLICATION NO.    : 14/785686
DATED              : February 21, 2017
INVENTOR(S)        : Elad Barkan It is certified that error appears in the above-identified patent and that said Letters Patent is hereby corrected as shown below:

In Column 1, In Line 12, after 2013, insert -- and --.

In Column 32, In Line 59, In Claim 1, delete "relecting" and insert -- rejecting --, therefor.

In Column 32, In Line 62, In Claim 1, delete "reiection" and insert -- rejection --, therefor.

In Column 36, In Line 38, In Claim 36, delete "resection" and insert -- rejection --, therefor.

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*